(12) United States Patent
Chen et al.

(10) Patent No.: US 12,440,442 B2
(45) Date of Patent: Oct. 14, 2025

(54) THERMOGELLING NANOEMULSIONS FOR PHARMACEUTICAL MANUFACTURING

(71) Applicant: Massachusetts Institute of Technology, Cambridge, MA (US)

(72) Inventors: Liang-Hsun Chen, Cambridge, MA (US); Patrick S. Doyle, Cambridge, MA (US)

(73) Assignee: MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 706 days.

(21) Appl. No.: 17/557,696

(22) Filed: Dec. 21, 2021

(65) Prior Publication Data
US 2022/0265554 A1    Aug. 25, 2022

Related U.S. Application Data

(60) Provisional application No. 63/153,472, filed on Feb. 25, 2021.

(51) Int. Cl.
| | | |
|---|---|---|
| *A61K 9/107* | (2006.01) | |
| *A61K 9/00* | (2006.01) | |
| *A61K 9/16* | (2006.01) | |
| *A61K 9/20* | (2006.01) | |
| *A61K 47/02* | (2006.01) | |
| *A61K 47/26* | (2006.01) | |
| *A61K 47/38* | (2006.01) | |

(52) U.S. Cl.
CPC ............ *A61K 9/1075* (2013.01); *A61K 9/006* (2013.01); *A61K 9/16* (2013.01); *A61K 9/2095* (2013.01); *A61K 47/02* (2013.01); *A61K 47/26* (2013.01); *A61K 47/38* (2013.01)

(58) Field of Classification Search
CPC ........ A61K 9/1075; A61K 9/006; A61K 9/16; A61K 9/2095; A61K 47/02; A61K 47/26; A61K 47/38; A61K 9/2054; A61K 9/5161
See application file for complete search history.

(56) References Cited

PUBLICATIONS

Chen et al. (Cn 102600106A Machine English Translation) (Year: 2012).*
An, et al., "Nanoemulsion Composite Microgels for Orthogonal Encapsulation and Release", Adv. Mater., 24(28):3838-3844 (2012).
An, et al., Mass production of shaped particles through vortex ring freezing, Nat. Commun., 7:12401 (2016).
Badruddoza, et al., "Core-Shell Composite Hydrogels for Controlled Nanocrystal Formation and Release of Hydrophobic Active Pharmaceutical Ingredients", Adv. Healthc. Mater., 5(15):1960-1968 (2016).
Badruddoza, et al., "Low Energy Nanoemulsions as Templates for the Formulation of Hydrophobic Drugs", Adv. Ther., 1(1):1700020 (2018).
Bain, et al., "In situ fast gelling formulation of methyl cellulose for in vitro ophthalmic controlled delivery of ketorolac tromethamine", J. Appl. Polym. Sci., 113(2):1241-1246 (2009).
Beesabathuni, et al., "Getting in shape: Molten wax drop deformation and solidification at an immiscible liquid interface", J. Colloid Interface Sci., 445:231-242 (2015).
Cai, et al., "A new methodology for high drug loading wet granulation formulation development", Int. J. Pharm., 441(1-2):790-800 (2013).
Cao and Mezzenga, "Design principles of food gels", Nat. Food, 1:106-118 (2020).
Chan, et al., "Prediction models for shape and size of ca-alginate macrobeads produced through extrusion-dripping method", J. Colloid Interface Sci., 338(1):63-72 (2009).
Chen, et al., "Nanoemulsion-Loaded Capsules for Controlled Delivery of Lipophilic Active Ingredients", Adv. Sci., 7(20):2001677 (2020).
Domenech and Doyle, "High Loading Capacity Nanoencapsulation and Release of Hydrophobic Drug Nanocrystals from Microgel Particles", Chem. Mater., 32(1):498-509 (2020).
Dwyer, et al., "Confined crystallization of fenofibrate in nanoporous silica", CrystEngComm., 17(41):7922-7929 (2015).
Eral, et al., "Composite Hydrogels Laden with Crystalline Active Pharmaceutical Ingredients of Controlled Size and Loading", Chem. Mater., 26(21):6213-6220 (2014).
Ford, et al., "Mathematical modelling of drug release from hydroxypropylmethylcellulose matrices: Effect of temperature", Int. J. Pharm., 71(1-2):95-104 (1991).
Gao, et al., "Drug nanocrystals: In vivo performances", J. Control. Release, 160(3):418-430 (2012).
Godfrin, et al., "Photopolymerized Micelle-Laden Hydrogels Can Simultaneously Form and Encapsulate Nanocrystals to Improve Drug Substance Solubility and Expedite Drug Product Design", Small, 15(6):1803372 (2019).
Gupta, "Metal Boride-Based Catalysts for Electrochemical Water-Splitting: A Review", Adv. Funct. Mater., 30(1):1906481 (2020).
Gupta, et al., "A General Route for Nanoemulsion Synthesis Using Low-Energy Methods at Constant Temperature", Langmuir, 33(28):7118-7123 (2017).
Gupta, et al., "Controlling and Predicting Droplet Size of Nanoemulsions: Scaling Relations with Experimental Validation", Soft Matter, 12(5):1452-1458 (2016).

(Continued)

*Primary Examiner* — Robert A Wax
*Assistant Examiner* — Quanglong N Truong
(74) *Attorney, Agent, or Firm* — Pabst Patent Group LLP

(57) ABSTRACT

Compositions contain nanoparticles containing nanocrystals of hydrophobic therapeutic, diagnostic, prophylactic agents, or a combination thereof, encapsulated in thermogelling polymers, such as methyl cellulose. Because of the templating of the compositions on a thermogelling nanoemulsion system, the compositions can be formed with precise control of the sizes of the nanoparticles as well as the high loadings of these hydrophobic therapeutic, diagnostic, prophylactic agents, or a combination thereof. Also described are methods of making and using the compositions.

57 Claims, 23 Drawing Sheets

(56) References Cited

PUBLICATIONS

Heinz, et al., "Understanding the solid-state forms of fenofibrate—a spectroscopic and computational study", Eur. J. Pharm. Biopharm., 71(1):100-8 (2009).

Hoare and Kohane, "Hydrogels in drug delivery: Progress and challenges", Polymer, 49(8):1993-2007 (2008).

Ishikawa, et al., "Effect of hydroxypropylmethylcellulose (HPMC) on the release profiles and bioavailability of a poorly water-soluble drug from tablets prepared using macrogol and HPMC", Int. J. Pharm., 202(1-2):173-178 (2000).

Ju, et al., "Drug Release from Hydrophilic Matrices. 1. New Scaling Laws for Predicting Polymer and Drug Release Based on the Polymer Disentanglement Concentration and the Diffusion Layer", J. Pharm. Sci., 84(12):1455-1463 (1995).

Junghanns and Müller, "Nanocrystal technology, drug delivery and clinical applications", Int. J. Nanomedicine, 3(3):295-309 (2008).

Karki, et al., "Thin films as an emerging platform for drug delivery", Asian J. Pharm. Sci., 11(5):559-574 (2016).

Kiortsis, et al., "Drug release from tableted wet granulations comprising cellulosic (HPMC or HPC) and hydrophobic component", Eur. J. Pharm. Biopharm., 59(1):73-83 (2005).

Kobayashi, et al., "Thermoreversible Gelation of Aqueous Methylcellulose Solutions", Macromolecules, 32(21):7070-7077 (1999).

Li and Mooney, "Designing hydrogels for controlled drug delivery", Nat. Rev. Mater., 1:16071 (2016).

Li, et al., "Gel Network Structure of Methylcellulose in Water", Langmuir, 17(26):8062-8068 (2001).

Loftsson and Brewster, "Pharmaceutical applications of cyclodextrins: basic science and product development", J. Pharm. Pharmacol., 62(11):1607-21 (2010).

Melnik, et al., "Pharmacopaine aspects of extemporaneous technology of soft medicines and suppositories", J. Adv. Pharm. Educ. Res., 10(1):60-65 (2020).

Miwa, et al., "Prediction of suitable amount of water addition for wet granulation", Int. J. Pharm., 195(1-2):81-92 (2000).

Moon, et al., "Elimination of Unreacted Acrylate Double Bonds in the Polymer Networks of Microparticles Synthesized via Flow Lithography", Langmuir, 36(9):2271-2277 (2020).

Oka, et al., "Analysis of the origins of content non-uniformity in high-shear wet granulation", Int. J. Pharm., 528(1-2):578-585 (2017).

Peppas, et al., "Hydrogels in biology and medicine: from molecular principles to bionanotechnology", Adv. Mater., 18(11):1345-1360 (2006).

Pregent, et al., "The impact and deformation of a viscoelastic drop at the air-liquid interface", J. Colloid Interface Sci., 331(1):163-173 (2009).

Rabinow, "Nanosuspensions in drug delivery", Nat. Rev. Drug Discov., 3(9):785-796 (2004).

Reker, et al., ""Inactive" ingredients in oral medications", Sci. Transl. Med., 11(483):eaau6753 (2019).

Rosen and Abribat, "The rise and rise of drug delivery", Nat. Rev. Drug Discov., 4(5):381-5 (2005).

Sarkar, "Thermal gelation properties of methyl and hydroxypropyl methylcellulose", J. Appl. Polym. Sci., 24(4):1073-1087 (1979).

Sastry, et al., "Recent technological advances in oral drug delivery—a review", Pharm. Sci. Technol. Today, 3(4):138-145 (2000).

Shah, et al., "A Review: Pharmaceutical and Pharmacokinetic Aspect of Nanocrystalline Suspensions", J. Pharm. Sci., 105(1):10-24 (2016).

Siepmann and Peppas, "Modeling of drug release from delivery systems based on hydroxypropyl methylcellulose (HPMC)", Adv. Drug Deliv. Rev., 64(Supplement):163-174 (2012).

Sievens-Figueroa, et al., "Preparation and characterization of hydroxypropyl methyl cellulose films containing stable BCS Class II drug nanoparticles for pharmaceutical applications", Int. J. Pharm., 423(2):496-508 (2012).

Suh, et al., "Using Stop-Flow Lithography To Produce Opaque Microparticles: Synthesis and Modeling", Langmuir, 27(22):13813-13819 (2011).

Tadros, "Correlation of viscoelastic properties of stable and flocculated suspensions with their interparticle interactions", Adv. Colloid Interface Sci., 68:97-200 (1996).

Tate, et al., "Biocompatibility of methylcellulose-based constructs designed for intracerebral gelation following experimental traumatic brain injury", Biomaterials, 22(10):1113-23 (2001).

Vogt, et al., "Dissolution enhancement of fenofibrate by micronization, cogrinding and spray-drying: comparison with commercial preparations", Eur. J. Pharm. Biopharm., 68(2):283-8 (2008).

Vulic and Shoichet, "Tunable Growth Factor Delivery from Injectable Hydrogels for Tissue Engineering", J. Am. Chem. Soc., 134(2):882-885 (2012).

Willecke et al., "Identifying overarching excipient properties towards an in-depth understanding of process and product performance for continuous twin-screw wet granulation", Int. J. Pharm., 522(1-2):234-247 (2017).

Willecke, et al., "A novel approach to support formulation design on twin screw wet granulation technology: Understanding the impact of overarching excipient properties on drug product quality attributes", Int. J. Pharm., 545(1-2):128-143 (2018).

Xu, et al., "Controllable Gelation of Methylcellulose by a Salt Mixture", Langmuir, 20(15):6134-6138 (2004).

Ying, et al., "Polymorph formation in fenofibrate in the absence and presence of polymer stabilizers: a low wavenumber Raman and differential scanning calorimetry study", J. Raman Spectrosc., 48(5):750-757 (2017).

Zdziennicka, et al., "Macroscopic and Microscopic Properties of Some Surfactants and Biosurfactants", Int. J. Mol. Sci., 19(7):1934 (2018).

Zhang, et al., "Zero-order release of poorly water-soluble drug from polymeric films made via aqueous slurry casting", Eur. J. Pharm. Sci., 117:245-254 (2018).

* cited by examiner

THERMOGELLING NANOEMULSIONS FOR PHARMACEUTICAL MANUFACTURING

CROSS-REFERENCE TO RELATED APPLICATIONS

This application claims the benefit of and priority to U.S. application Ser. No. 63/153,472, filed on Feb. 25, 2021, which is hereby incorporated herein by reference in its entirety.

STATEMENT REGARDING FEDERALLY SPONSORED RESEARCH

This invention was made with Government support under Grant No. DMR1419807 and CMMI1824297 awarded by the National Science Foundation (NSF). The Government has certain rights in the invention.

FIELD OF THE INVENTION

The invention is generally in the field of delivery of agents, particularly high loadings, with enhanced control of the loadings, of hydrophobic agents achieved via the formation of the nanocrystals from in situ templated nanodroplets containing these hydrophobic agents and thermogelling polymers.

BACKGROUND OF THE INVENTION

Pharmaceutical formulations play an important role in transforming a drug substance into the final drug product taken by a patient. They involve processes that combine an active pharmaceutical ingredient (API) and a mixture of inactive excipients into a final drug product with desired therapeutic effects and physical properties (Reker, et al., *Sci. Transl. Med.* 2019, 11, 1). Among various drug products, oral solid dosage forms are the most preferred product forms dominating the market because of their high patient compliance and wide acceptance (Rosen and Abribat, *Nat. Rev. Drug Discov.* 2005, 4, 381; Sastry, et al., *Pharm. Sci. Technol. Today* 2000, 3, 138). However, conventional oral drug formulations typically require costly multistep manufacturing, and poor bioavailability of hydrophobic APIs still remains a persistent challenge in many formulations. It has been reported that 40% of marketed drugs and 90% of drug candidates in the pipeline are hydrophobic (Loftsson and Brewster, *J. Pharm. Pharmacol.* 2010, 62, 1607). Their poor water-solubility renders the drugs difficult to be absorbed in the gastrointestinal tract, greatly undermining their potency. Over the past decade, many attempts have been made to develop methods for producing API nanocrystals that possess improved solubility and bioavailability because of their significantly larger specific surface area compared to their bulk counterparts (Rabinow, *Nat. Rev. Drug Discov.* 2004, 3, 785; Junghanns and Müller, *Int. J. Nanomedicine* 2008, 3, 295; Gao, et al., *J. Control. Release* 2012, 160, 418). However, incorporation of the methods into conventional formulation processes is susceptible to many problems. For example, suitable excipients have to be investigated through tedious trial-and-error experiments (Miwa, et al., *Int. J. Pharm.* 2000, 195, 81; Willecke, et al., *Int. J. Pharm.* 2017, 522, 234; Willecke, et al., *Int. J. Pharm.* 2018, 545, 128), and API inhomogeneity raises a potential risk that causes overdosed or ineffective treatment (Oka, et al., *Int. J. Pharm.* 2017, 528, 578).

Methylcellulose (MC) and hydroxypropyl methylcellulose (HPMC) are two types of natural-based cellulose ether excipients that have been widely formulated into oral solid dosage forms in food and pharmaceutical applications (Patel, *Adv. Funct. Mater.* 2020, 30, 1; Cao and Mezzenga, *Nat. Food* 2020, 1, 106; Dow, Midland, MI Dow Chem. Co. 2000). Their unique swelling and erosion behaviors are suitable for the design of controlled release systems and for the study of drug delivery models (Siepmann and Peppas, *Adv. Drug Deliv. Rev.* 2012, 64, 163). Upon contact with water, a gel layer can form on the polymer surface due to rapid hydration, which slows down further water penetration into the inner dry polymer core (Ju, et al., *J. Pharm. Sci.* 1995, 84, 1455). In addition, fast release can be easily achieved with the use of MC which shows a much faster matrix erosion than HPMC (Siepmann and Peppas, *Adv. Drug Deliv. Rev.* 2012, 64, 163). Despite these ideal properties, formulations of these cellulose ethers and hydrophobic APIs into drug products still lack efficient control over API nanocrystal sizes and heavily depend on multiple blending, sieving, and granulation steps (Kiortsis, et al., *Eur. J. Pharm. Biopharm.* 2005, 59, 73; Ishikawa, et al., *Int. J. Pharm.* 2000, 202, 173). Reversible thermal gelation is another "smart" property of MC and HPMC that has gained considerable attention in the field of rheology (Kobayashi, et al., *Macromolecules* 1999, 32, 7070; Sarkar, *J. Appl. Polym. Sci.* 1979, 24, 1073) and tissue engineering (Tate, et al., *Biomaterials* 2001, 22, 1113; Vulic and Shoichet, *J. Am. Chem. Soc.* 2012, 134, 882). The polymer gels upon heating and returns to the sol state upon subsequent cooling (Sarkar, *J. Appl. Polym. Sci.* 1979, 24, 1073). Although researchers have applied this property to develop in situ gelling materials for drug delivery (Gupta, et al, *Biomaterials* 2006, 27, 2370; Bain, et al., *J. Appl. Polym. Sci.* 2009, 113, 1241), the utility of the thermal gelation property in the formulation of dosage forms, such as oral solid dosage forms still remains unexplored.

In recent years, hydrogels have been exploited as promising materials for drug product formulations because they can be readily customized into particles with various sizes and shapes (An, et al., *Adv. Mater.* 2012, 24, 3838; Chen, et al., *Adv. Sci.* 2020, 2001677, 1; Li and Mooney, *Nat. Rev. Mater.* 2016, 1, 1). However, hydrogels are hydrophilic in nature and incompatible with hydrophobic drugs (Hoare and Kohane, *Polymer (Guildf)*. 2008, 49, 1993; Peppas, et al., *Adv. Mater.* 2006, 18, 1345). To address the incompatibility issue and induce API nanocrystalization in the hydrogel matrix, new technologies have been developed by incorporating hydrophobic nanodomains into hydrophilic hydrogels (Badruddoza, et al., *Adv. Healthc. Mater.* 2016, 5, 1960; Badruddoza, et al., *Adv. Ther.* 2018, 1, 1700020; Domenech and Doyle, *Chem. Mater.* 2020, 32, 498; Eral, et al., *Chem. Mater.* 2014, 26, 6213; Godfrin, et al., *Small* 2019, 15, 1). The hydrophobic nanodomains, such as oil-in-water nanoemulsions and surfactant micelles, are able to control the formation of API nanocrystals in the hydrogel matrix with tailored drug loadings. However, hydrogel formation is greatly limited to materials with well-known gelation techniques, such as free radical photopolymerization (Godfrin, et al., *Small* 2019, 15, 1) and ionic-crosslinking (Badruddoza, et al., *Adv. Ther.* 2018, 1, 1700020; Domenech and Doyle, *Chem. Mater.* 2020, 32, 498; Eral, et al., *Chem. Mater.* 2014, 26, 6213). These materials are generally not the ideal excipients for oral drug formulation due to their slow release (Godfrin, et al., *Small* 2019, 15, 1), large release resistance at high drug loadings (Badruddoza, et al., *Adv. Healthc. Mater.* 2016, 5, 1960; Domenech and Doyle, *Chem. Mater.*

2020, 32, 498; Eral, et al., *Chem. Mater.* 2014, 26, 6213), and potential toxicity (Moon, et al., *Langmuir* 2020, 36, 2271). Methylcellulose (MC) is an attractive fast-eroding excipient without the above limitations, though formulation approaches have generally not taken advantage of its gelation properties in forming the drug product.

It is therefore an object of the present invention to provide pharmaceutically acceptable dosage forms for extended delivery of hydrophobic therapeutic, prophylactic, or diagnostic agents.

It is a further object of the present invention to provide dosage with precise control of drug loadings and also achieving high drug loadings.

It is a still further object of the present invention to provide these dosages for drugs with low bioavailability due to the drugs being in crystalline and/or complex forms.

SUMMARY OF THE INVENTION

To bridge the gap between the use of fast-eroding thermogelling polymers, such as methylcellulose (MC), and the efficiency of formulations, such as oral drug formulations, a thermogelling nanoemulsion system was developed. This involves facile thermal processing methods for the preparation of composite particles and versatile dosage forms with hydrophobic API nanocrystals embedded in the thermogelling polymer matrix. To prepare the nanoemulsion, a pre-emulsion is first prepared by vortexing a mixture of the continuous phase, dispersed phase, and a surfactant such as polyethylene glycol sorbitan monooleate (TWEEN® 80). The pre-emulsion is then ultrasonicated, ions added (for example, NaCl) and vortexed to fom the nanoemulsion. Thermogel particles are prepared by a thermal dripping method. For example, a dispersed oil phase of a hydrophobic drug such as fenofibrate in ethyl acetate is prepared and added to a solution of a hydrophilic polymer such as a 5 wt % MC solution including a surfactant such as 0.1 g TWEEN® 80 to prepare a nanoemulsion. The nanoemulsion is gelled, for example, at 50° C. and the solvent removed by evaporation. The resulting thermogel is then redispersed into deionized water to form a MC-stabilized nanoparticle suspension.

BRIEF DESCRIPTION OF THE DRAWINGS

FIG. 1F varies TWEEN® 80 mass (0, 0.01, 0.03, 0.05, 0.1 g) and FIG. 1G varies oil phase mass (0.3, 0.6, 0.9 g). The gray area indicates the range of theoretical limiting area occupied for one TWEEN® 80 molecule on an interface (Zdziennicka, et al., *Int. J. Mol. Sci.* 2018, 19, DOI 10.3390/ijms19071934).

FIG. 3A shows drug loading of the particles as a function of oil phase mass (fixed 3 g MC solution, 0.1 g TWEEN® 80, 0.1 g NaCl). FIG. 3B shows drug loadings of the dried API-loaded particles as a function of TWEEN® 80 mass (fixed 3 g MC solution, 0.3 g oil phase, 0.1 g NaCl). In both FIGS. 3A and 3B, the dashed curve corresponds to Equation S18 with $\zeta_{Tw80}=0$ and $\zeta_{NaCl}=0$ (complete removal of TWEEN® 80 and NaCl). The dotted curve corresponds to Equation S18 with $\zeta_{Tw80}=1$ and $\zeta_{NaCl}=0.3$ (100% and 30% retention for TWEEN® 80 and NaCl). The dash-dotted curve corresponds to Equation S18 with $\zeta_{Tw80}=1$ and $\zeta_{NaCl}=1$ (complete retention of TWEEN® 80 and NaCl).

FIG. 6A shows cumulative release profiles of the as-received bulk fenofibrate crystals (diameter~239.6 μm) and the particles with different oil phase addition (fixed 3 g MC solution, 0.1 g TWEEN® 80, 0.1 g NaCl). FIG. 6B shows the cumulative release profiles of the bulk fenofibrate crystals and the dried API-loaded particles with different TWEEN® 80 mass. FIG. 6C shows the cumulative release profiles of particles with different diameters (obtained via crushing and varying dispensing tip size for the canonical formulation). The legend includes the particle diameter and tip specification. FIG. 6D shows time at 80% drug release ($t_{80}$) plotted against the drug loading for different conditions. FIG. 6E shows time at 80% drug release ($t_{80}$) of the dried methylcellulose particles and the alginate particles for different drug loadings. FIGS. 6F and FIG. 6G show erosion rate ($a/t_{80}$) (FIG. 6F) and diffusivity ($a^2/t_{80}$) (FIG. 6G) comparisons for the dried methylcellulose particles and the alginate particles. a is the radius of dried particles. The result for the alginate particles is from Domenech and Doyle, *Chem. Mater.* 2020, 32, 498. FIG. 6H shows a fitting of the release profile of the canonical condition with the power law and erosion models. FIG. 6I shows results for power law fitting: diffusional exponents n for various conditions. FIG. 6J shows relationship between the erosion constant ($k_e$) and particle size. FIG. 6K shows the correlation between the lag time ($t_{lag}$) and particle size.

DETAILED DESCRIPTION OF THE INVENTION

I. Definitions

Figure 1A:
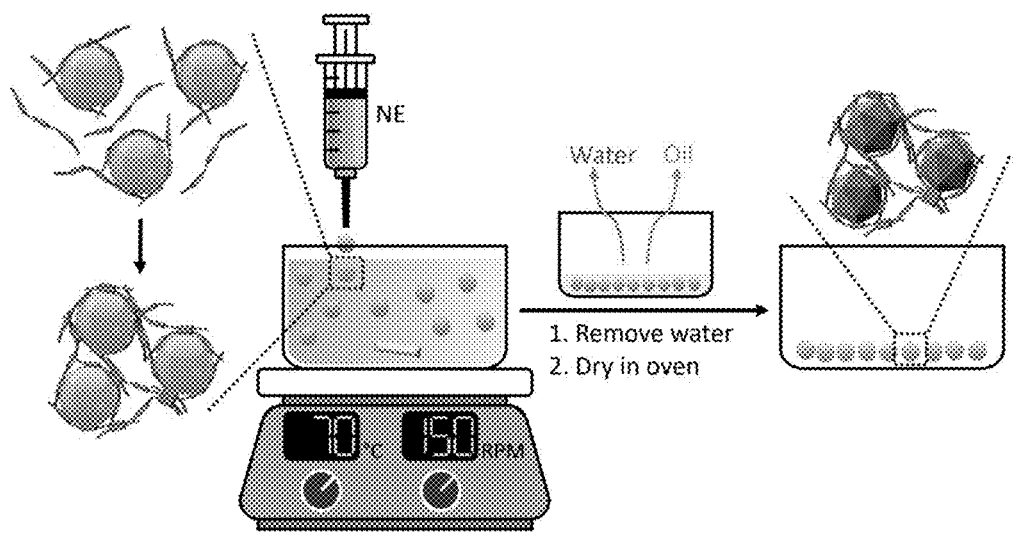
FIG. 1A is a non-limiting schematic of the method of making drug loaded nanoparticles.

The term "about" is intended to describe values either above or below the stated value in a range of approximately +/−10%; in other forms, the values may range in value either above or below the stated value in a range of approximately +/−5. The preceding ranges are intended to be made clear by context, and no further limitation is implied.

The term "hydrophobic," as used herein, refers to the property of lacking affinity for or repelling water. For example, the more hydrophobic a compound, the more that compound tends to not dissolve in, not mix with, or not be wetted by water. Hydrophobicity can be quantified by measuring a compound's partition coefficient between water (or a buffered aqueous solution) and a water-immiscible organic solvent, such as octanol, methylene chloride, or methyl tert-butyl ether. If after equilibration a greater concentration of the compound is attained in the organic solvent than in water, the compound is considered hydrophobic. For example, if the organic solvent is octanol, then a positive log P value indicates that the compound is hydrophobic. "Hydrophobic" may also refer to a compound that when applied to a surface, such as glass, forms a contact angle with water, which is greater than the contact angle of water on a surface of glass without the compound.

The term "macroparticle" refers to particles that can be viewed by the unaided eye. These macroparticles have at least one dimension greater than 1 mm. They include particles with dimensions, such as an average diameter, between 1 mm and 10 mm, inclusive. Where macroparticles are spheres or spheroids, the macroparticles include those with an average diameter, as defined by the lengths of their principal axes, between 1 mm and 10 mm, inclusive. Spheres and spheroids are shapes with curved surfaces that can be defined by rotation of circles, ellipses, or a combination around each of the three perpendicular axes, a, b, and c. For a sphere, the three axes are the same length. For oblate spheroids (also referred to as oblate ellipsoids of rotation), the length of the axes are a=b>c. For prolate spheroids (also referred to as prolate ellipsoids of rotation), the length of the axes are a=b<c. Other suitable shapes of macroparticles include disks, cylinders, rods, cubes, toruses, and flat surfaces.

The term "nanocrystal" refers to particles having at least one dimension, such as an average diameter from about 1 nm up to, but not including, about 1 micron, and composed of atoms in either a single- or poly-crystalline arrangement. In some forms, "nanocrystal" includes particles having at least one dimension, such as an average diameter, small than 500 nm, with the atomic crystalline arrangement described herein. The nanocrystals are substantially free of solvent, such as having less than 20% wt/wt solvent, as measured via a thermogravimetric analyzer.

The term "nanoparticle," as used herein, refers to structures of any shape having an average diameter from about 1 nm up to, but not including, about 1 micron. Nanoparticles having a spherical shape are generally referred to as "nanospheres." The nanoparticles have a high percentage (by weight) of hydrophobic therapeutic, diagnostic, prophylactic agents, or a combination thereof. "High percentage" includes percentages such as at least 45% wt/wt of the hydrophobic therapeutic, diagnostic, prophylactic agents, or a combination thereof, as measured using UV-Vis spectroscopy. Unless otherwise specified, the drug loadings described herein are in units of wt/wt.

The term "nanoemulsion" refers to a submicron colloidal dispersion containing oil droplets that have hydrophobic therapeutic, diagnostic, prophylactic agents, or a combination thereof, dispersed in a water phase.

The term "stable" or "stability," when used in the context of nanoemulsion droplets, refers to nanoemulsion droplets within a matrix of polymers or mixture of polymers. The nanoemulsion droplets do not coalesce or aggregate over a typical time scale of processing the formulation into a crosslinked gel state. The time scale is typically within a few hours, such as one or two hours.

The term "thermogelling," as relates to polymers, refers to stimuli-responsive polymers that undergo a sol-to-gel transition in response to temperature, preferably in response to increasing temperature. The formed gel is referred to as a thermogel.

"Water-soluble", as used herein, generally means at least about 10 g is soluble in 1 L of water, i.e., at neutral pH, at 20° C.

II. Compositions

A thermogelling nanoemulsion system was formed using thermal processing methods for the preparation of composite particles and dosage forms with hydrophobic active pharmaceutical ingredients (API) nanocrystals embedded in a thermogelling polymer matrix. To prepare the nanoemulsion, a pre-emulsion is first prepared by vortexing a mixture of the continuous phase, dispersed phase, and a nonionic surfactant such as polyethylene glycol sorbitan monooleate (TWEEN® 80). The pre-emulsion is then ultrasonicated, optionally ions added (for example, NaCl), and vortexed to form the nanoemulsion. Thermogel particles are prepared, for example, by a thermal dripping method, where the nanoemulsion is dripped into a gelation bath maintained at a temperature sufficient for gelling the nanoemulsion.

For example, a dispersed oil phase of a hydrophobic drug in a solvent such as ethyl acetate is prepared and added to a solution of a hydrophilic polymer such as a MC solution including a surfactant such as 0.1 g TWEEN® 80 to prepare a nanoemulsion. In this case, the MC is the thermogelling polymer. The nanoemulsion is gelled, for example, at 50° C. and the solvent removed by evaporation. The resulting thermogel is then dried to form nanoparticles containing nanocrystals encapsulated in the hydrophilic polymer, such as MC. The nanoparticles can be redispersed into deionized water to form a MC-stabilized nanoparticle suspension.

In general, the thermogelling nanoemulsion system can be gelled, and directly dried leading to the precise formation of a composition containing nanocrystals templated by nanodroplets in the thermogelling nanoemulsion system. An important advantage of the composition over other compositions containing therapeutic, prophylactic, and/or diagnostic agents, is that the compositions can be formed with precise control of (i) the loadings of these agents, (ii) the sizes of particles, such as nanoparticles, in the composition, or (iii) both. The composition contains nanoparticles that contain nanocrystals encapsulated in thermogelling polymers. The nanocrystals contain hydrophobic therapeutic, diagnostic, prophylactic agents, or a combination thereof. Preferably, the hydrophobic therapeutic, diagnostic, prophylactic agents, or a combination thereof, contain at least 50% wt/wt of the nanoparticles, as measured using UV-Vis spectroscopy. Preferably, the nanocrystals contain hydrophobic therapeutic agents. Preferably, at least 80% of the nanoparticles have an average diameter within 10% of 200 nm, as measured using dynamic light scattering or scanning electron microscopy. Further, the nanocrystals have an average diameter between 100 nm and 135 nm, as measured using scanning electron microscopy. The composition can also be defined by the low polydispersity index of particles in the composition. Accordingly, the nanoparticles, nanocrystals, or both, have a polydispersity index less than 0.25, as measured via dynamic light scattering or scanning electron microscopy.

The sizes of particles in the composition can be controlled by the selection and ratio of components, and rate of mixing. In some forms, the absence of a non-ionic surfactant in the nanoemulsion can lead to relatively large droplets, such that the resulting viscosity is not sufficient to overcome the impact and drag forces exerted by the surrounding solvent (e.g. water) in the gelation bath during the dripping of the nanoemulsion into the gelation bath. In some forms, a small addition of a non-ionic surfactant (e.g. 0.05 g TWEEN® 80) can facilitate the formation of spherical thermogel particles. Particle size also increases with increasing oil phase mass, because a higher oil fraction can create a higher solid content after drying. Lastly, increasing the outer diameter of the dispensing tip during the thermal dripping process tends to increase particle size.

In some forms, the composition can be defined via a process of making the composition. In these forms, forming the nanoparticles involves heating a nanoemulsion containing: (i) a dispersed oil phase that contains the hydrophobic therapeutic, diagnostic, prophylactic agents, or the combination thereof, and (ii) a continuous water phase that contains the thermogelling polymers. Further, heating the nanoemulsion forms a gel matrix containing oil nanodroplets locked inside the gel matrix. The oil nanodroplets contain the hydrophobic therapeutic, diagnostic, prophylactic agents, or a combination thereof. The gel matrix contains the thermogelling polymers, some or all of which are adsorbed on to the surface of the oil nanodroplets. Further, in these forms, forming the nanoparticles involves evaporating solvent from the oil nanodroplets.

Further details about the components of the composition and their properties are described below.

A. Nanoparticles

Uniformly sized nanocrystals of hydrophobic therapeutic, prophylactic, diagnostic agents, or a combination thereof, are formed into nanoparticles by adding saturated solutions of these agents, or combination thereof, to a solution of a thermogelling polymer. The solution containing the agents forms a dispersed oil phase, while the solution containing the thermogelling polymer forms a continuous phase. Optionally, a nonionic surfactant such as polyethylene glycol sorbitan monooleate (TWEEN® 80), is present in the mixture. This mixture is vortexed to form a pre-emulsion, and further ultrasonicated (if needed) to form a nanoemulsion. Optionally, suitable ions, such as sodium chloride, are added to the nanoemulsion and further vortexed. The nanoemulsion is gelled by dripping into a water bath maintained at a temperature sufficient to gel the nanoemulsion, and then the resulting thermogel dried to produce nanoparticles. The nanoparticles contain the thermogelling polymer, encapsulating the nanocrystals. As discussed above, templating the formation of the nanoparticles on nanodroplets in the thermogelling nanoemulsion system affords the precise control of the loadings of agents and/or the sizes of the particles, such as nanoparticles, in the composition. For instance, ultra-sonication and/or homogenization of the pre-emulsion to form the nanoemulsion can lead to a uniform distribution of nanodroplets in the nanoemulsion. The presence of a non-ionic surfactant, such as as polyethylene glycol sorbitan monooleate (TWEEN® 80), can further stabilize the nanoemulsion and prevent aggregation of the nanodroplets. Lastly, addition of suitable ions, such as sodium chloride, can create salt-out ions (e.g. chloride ions) that can compete with thermogelling polymers (such as MC molecules) for water hydration, which facilitates and strengthens hydrophobic association of thermogelling polymers (such as MC molecules) into a gel network for better material encapsulation.

At the outset, as described above, the nanocrystals are formed by dissolving the hydrophobic therapeutic, prophylactic, diagnostic agents, or a combination thereof, in an appropriate organic solvent, preferably a solvent meeting the requirements of the US Food and Drug Administration for Generally Regarded as Safe (GRAS), such as ethyl acetate, and dispersed into an oil phase, preferably with non-ionic surfactant, such as polyethylene glycol sorbitan monooleate (TWEEN® 80).

For different nanoemulsion formulations, the observed nanoparticle size generally follows the estimated nanocrystal size, providing evidence of confined crystallization in nanodroplets within the nanoemulsions. In some forms, at least 80% of the nanoparticles have an average diameter within 10% of 200 nm, 300 nm, or 500 nm, preferably within 10% of 200 nm, such as 216.7 nm±2.46 nm, as measured via dynamic light scattering or scanning electron microscopy. In some forms, at least 80% of the nanoparticles have an average diameter within 10% of 200 nm, as measured via dynamic light scattering or scanning electron microscopy. In some forms, at least 80% of the nanoparticles have an average diameter within 10% of 300 nm, as measured via dynamic light scattering or scanning electron microscopy. In some forms, at least 80% of the nanoparticles have an average diameter within 10% of 500 nm, as measured via dynamic light scattering or scanning electron microscopy.

In some forms, at least 90% of the nanoparticles have an average diameter within 10% of 200 nm, 300 nm, or 500 nm, preferably within 10% of 200 nm, such as 216.7 nm±2.46 nm, as measured via dynamic light scattering or scanning electron microscopy. In some forms, at least 90% of the nanoparticles have an average diameter within 10% of 200 nm, as measured via dynamic light scattering or scanning electron microscopy. In some forms, at least 90% of the nanoparticles have an average diameter within 10% of 300 nm, as measured via dynamic light scattering or scanning electron microscopy. In some forms, at least 90% of the nanoparticles have an average diameter within 10% of 500 nm, as measured via dynamic light scattering or scanning electron microscopy.

In some forms, at least 95% of the nanoparticles have an average diameter within 10% of 200 nm, 300 nm, or 500 nm, preferably within 10% of 200 nm, such as 216.7 nm±2.46 nm, as measured via dynamic light scattering or scanning electron microscopy. In some forms, at least 95% of the nanoparticles have an average diameter within 10% of 200 nm, as measured via dynamic light scattering or scanning electron microscopy. In some forms, at least 95% of the nanoparticles have an average diameter within 10% of 300 nm, as measured via dynamic light scattering or scanning electron microscopy. In some forms, at least 95% of the nanoparticles have an average diameter within 10% of 500 nm, as measured via dynamic light scattering or scanning electron microscopy.

i. Nanocrystals

The nanocrystals contain hydrophobic therapeutic, diagnostic, prophylactic agents, or a combination thereof. These agents can be hydrophobic proteins or peptides, nucleic acids, lipids, hydrophobic small molecules (molecular weight typically 1,000 Da or less), or combinations thereof. They can be classified among the following categories: anticancer agents, analgesics/antipyretics, antidepressants, antibiotics, antidiabetics, antihypertensive agents, immunosuppressive agents, anti-inflammatories, antianxiety agents, antimigraine agents, sedatives/hypnotics, antianginal agents, antipsychotic agents, antiarrhythmics, antiarthritic agents, anti-gout agents, anticoagulants, antifibrinolytic agents, hemorheologic agents, antiplatelet agents, anticonvulsants, antihistamines, antibacterial agents, antiviral agents, antipruritics, antimicrobials, bronchodilators, steroidal compounds, hormones and hormone analogues, hypoglycemic agents, hypolipidemic agents, antiulcer/anti-reflux agents, antinauseants/antiemetics, oil-soluble vitamins, or a combination thereof. These therapeutic agents and their alternative forms, such as alternative salt forms, free acid forms, free base forms, and hydrates, are contemplated.

The hydrophobic therapeutic, diagnostic, prophylactic agents, or a combination thereof are dissolved in a suitable solvent, such as ethyl acetate or anisole, and added to a continuous solvent such as water containing a thermogelling polymer, such as methylcellulose. If needed, a non-ionic surfactant such as polyethylene glycol sorbitan monooleate (TWEEN® 80) can be added. The mixture can be vortexed. If needed, ions (such as NaCl) can be added and the mixture ultrasonicated to form a nanoemulsion. Once a thermogel is formed, formed as described in the following non-limiting examples, a first quantity of the continuous solvent is substantially removed until the film thickness is comparable to particle size. Further, the continuous solvent and oil is substantially removed, typically by evaporation, forming nanocrystals containing the hydrophobic therapeutic, diagnostic, prophylactic agents, or a combination thereof.

The resulting nanocrystals are substantially free of solvent, containing less than 20% wt/wt, 15% wt/wt, 10% wt/wt, 9% wt/wt, 8% wt/wt, 7% wt/wt, 6% wt/wt, 5% wt/wt, 4% wt/wt, 3% wt/wt, 2% wt/wt, or 1% wt/wt solvent, as measured via a thermogravimetric analyzer.

In some forms, the nanocrystals are as described above, except that the nanocrystals have an average diameter between 1 nm and 999 nm, inclusive, between 50 nm and 500 nm, inclusive, 50 nm and 300 nm, inclusive, between 50 nm and 250 nm, inclusive, between 100 nm and 300 nm, inclusive, between 100 nm and 250 nm, inclusive, between 100 nm and 150 nm, inclusive, 100 nm and 135 nm, preferably 120 nm±13.6 nm, as measured via scanning electron microscopy. In some forms, the nanocrystals are as described above, except that they have an average diameter between 100 nm and 135 nm, preferably 120 nm±13.6 nm, as measured via scanning electron microscopy.

ii. Thermogelling Polymers

As described above, the nanoparticles contain thermogelling polymers. Preferably, the thermogelling polymers are water-soluble at 20° C. Typical thermogelling polymers include cellulose ethers (methylcellulose, hydroxypropyl methylcellulose, ethylcellulose), chitosan, gelatin, xyloglucan, dextran, poly(γ-glutamate), elastin, elastin-like polypeptide/oligopeptide, hyaluronic acid, N-isopropylacrylamide polymers, thermogelling poly(N-isopropylacrylamide)-b-poly(ethylene glycol)-b-poly(N-isopropylacrylamide), thermogelling poloxamers, nonionic triblock copolymers composed of a central hydrophobic chain of polyoxypropylene (poly(propylene oxide)) flanked by two hydrophilic chains of polyoxyethylene (poly(ethylene oxide)), poly(ethylene glycol) (PEG)-biodegradable polyester copolymers, poly(oxazoline), poly(organophosphazenes), blends, and copolymers thereof, i.e., copolymer containing the aforementioned polymers.

In some forms, the thermogelling polymers includes cellulose ethers. In some forms, the cellulose ethers include methylcellulose, hydroxypropyl methylcellulose, ethylcellulose, or a combination thereof. In some forms, the cellulose ethers include methylcellulose.

iii. Loadings of Hydrophobic Therapeutic, Diagnostic, or Prophylactic Agents in the Nanoparticles The nanoparticles have high percentages hydrophobic therapeutic, diagnostic, or prophylactic agents. In some forms, the percentages can be at least 45% wt/wt, 50%, 55% wt/wt, 60% wt/wt, 65% wt/wt, 70% wt/wt, 80% wt/wt, 85% wt/wt, 90% wt/wt, 91% wt/wt, 92% wt/wt, 93% wt/wt, 94% wt/wt, 95% wt/wt, 96% wt/wt, 97% wt/wt, 98% wt/wt, or 99% wt/wt. In some forms, the percentages can be at least 50%, 55% wt/wt, 60% wt/wt, 65% wt/wt, 70% wt/wt, 80% wt/wt, 85% wt/wt, 90% wt/wt, 91% wt/wt, 92% wt/wt, 93% wt/wt, 94% wt/wt, 95% wt/wt, 96% wt/wt, 97% wt/wt, 98% wt/wt, or 99% wt/wt. In some forms, the percentages can be at least 50%. The percentage of the hydrophobic therapeutic, diagnostic, prophylactic agents, or a combination thereof, can be measured using UV-Vis spectroscopy. In some forms, drug loadings can be increased by increasing the oil phase mass. This is because increasing the oil phase mass corresponds to a larger ratio of the dispersed to continuous phases, and the resulting dried particles have a higher drug loading and a lower thermogelling polymer content.

B. Crosslinking Agents

The thermogel can be formed via physical crosslinking between the thermogelling polymer, such as hydrophobic interactions, hydrogen bonding interactions, electrostatic interactions, or a combination thereof. Preferably, the thermogel is formed via hydrophobic interactions between the thermogelling polymers. In these forms, the thermogelling polymers serve as crosslinking agents. For instance, as the temperature is increased, such as when the nanoemulsion contacts a solvent bath (e.g. water bath) at a temperature sufficient to gel the nanoemulsion, hydrophobic units within the thermogelling polymer (such as methylcellulose) associate strongly into hydrophobic junctions, forming a gel network with the oil nanodroplets locally immobilized in the gel matrix.

In some forms, other materials can be used to serve as crosslinkers that crosslink nanodroplets that contain adsorbed thermogelling polymers. Crosslinkers that can serve this purpose include ions, such as multiply charged ions, including alkaline earth metal ions (e.g. $Ca^{2+}$, $Ba^{2+}$, $Sr^{2+}$, etc); charged peptides (such as poly-L-lysine, etc); etc.

C. Solvents and Surfactants

The hydrophobic therapeutic, diagnostic, prophylactic agents, or a combination thereof, are typically dissolved in an appropriate organic solvent, preferably a solvent meeting the requirements of the US Food and Drug Administration for Generally Regarded as Safe (GRAS). These are solvents that are acceptable for the formulation of pharmaceutical compositions. These solvents serve as media for dissolving these agents, and are readily removed (if needed) from the final product via physical methods such as evaporation. Examples include ethyl acetate and anisole.

In some forms, the composition contains non-ionic surfactants. The non-ionic surfactants can be added to a solvent containing the thermogelling polymers. In some forms, the non-ionic surfactants include, polyethylene glycol sorbitan monooleate, polyoxyethylene sorbitan monostearate, polyoxyethylene sorbitan monolaurate, polyoxyethylene sorbitan monopalmitate, polyoxyethylene sorbitan monooleate, polyoxyethylene sorbitan tristearate, polyoxyethylene monooleate, polyoxyethylene monostearate, polyoxyethylene monolaurate, polyoxyethylene sorbitan trioleate, glyceryl monostearate, sorbitan monooleate, sorbitan monolaurate, sorbitan monoisostearate, sorbitan monopalmitate, sorbitan monostearate, sorbitan sesquioleate, sorbitan trioleate, diglycerolsorbitan penta-2-ethylhexylate, diglycerolsorbitan tetra-2-ethylhexylate, or a combination thereof. In some forms, the non-ionic surfactants include a GRAS non-ionic surfactant, such as polyethylene glycol sorbitan monooleate. In some forms, the non-ionic surfactants include food grade non-ionic surfactants. Representative food grade non-ionic surfactants include lecithin, diacetyl tartaric acid esters of monodiglycerides, monodiglycerides, ethoxylated monoglycerides, and esters of fatty acids.

In some forms, the non-ionic surfactants have a hydrophilic-lipophilic balance value greater than 8.

D. Formulations

In some forms, the compositions can be formulated in a suitable pharmaceutical form.

In some forms, the composition is in the form of macroparticles. The macroparticles can include spheres, spheroids, or a combination thereof. In some forms, the spheres, spheroids, or the combination thereof have an average diameter between 1 mm and 10 mm, inclusive, such as 1.71±0.1 mm, as measured via dynamic light scattering, scanning electron microscopy, or confocal microscopy.

In some forms, the composition is in a liquid, solid, or semi-solid dosage form. Suitable dosage forms include, but are not limited to, a suspension dosage form, solution dosage form, paste dosage form, powder dosage form, tablet dosage form, film dosage form (such as thin film dosage form), capsule dosage form, granule dosage form, fibrous dosage forms, or paper dosage forms.

In some forms, the compositions are formulated using pharmaceutically acceptable carriers including but is not limited to, diluents, preservatives, binders, lubricants, disintegrators, swelling agents, fillers, stabilizers, and combinations thereof. Polymers used in the dosage form include hydrophobic or hydrophilic polymers and pH dependent or independent polymers. Preferred hydrophobic and hydrophilic polymers include, but are not limited to, hydroxypropyl methylcellulose, hydroxypropyl cellulose, hydroxyethyl cellulose, carboxy methylcellulose, polyethylene glycol, ethylcellulose, microcrystalline cellulose, polyvinyl pyrrolidone, polyvinyl alcohol, polyvinyl acetate, and ion exchange resins.

Optional pharmaceutically acceptable excipients include, but are not limited to, diluents, binders, lubricants, disintegrants, colorants, stabilizers, and surfactants.

Diluents, also referred to as "fillers," are typically necessary to increase the bulk of a solid dosage form so that a practical size is provided for compression of tablets or formation of beads and granules. Suitable diluents include, but are not limited to, dicalcium phosphate dihydrate, calcium sulfate, lactose, sucrose, mannitol, sorbitol, cellulose, microcrystalline cellulose, kaolin, sodium chloride, dry starch, hydrolyzed starches, pregelatinized starch, silicone dioxide, titanium oxide, magnesium aluminum silicate, and powdered sugar. The usual diluents include inert powdered substances such as starches, powdered cellulose, especially crystalline and microcrystalline cellulose, sugars such as fructose, mannitol and sucrose, grain flours, and similar edible powders. Typical diluents include, for example, various types of starch, lactose, mannitol, kaolin, calcium phosphate or sulfate, inorganic salts such as sodium chloride, and powdered sugar. Powdered cellulose derivatives are also useful.

Binders are used to impart cohesive qualities to a solid dosage formulation, and thus ensure that a tablet or bead or granule remains intact after the formation of the dosage forms. Suitable binder materials include, but are not limited to, starch, pregelatinized starch, gelatin, sugars (including sucrose, glucose, dextrose, lactose and sorbitol), polyethylene glycol, waxes, natural and synthetic gums such as acacia, tragacanth, sodium alginate, cellulose, including hydroxypropylmethylcellulose, hydroxypropylcellulose, ethylcellulose, and veegum, and synthetic polymers such as acrylic acid and methacrylic acid copolymers, methacrylic acid copolymers, methyl methacrylate copolymers, aminoalkyl methacrylate copolymers, polyacrylic acid/polymethacrylic acid and polyvinylpyrrolidone. Typical tablet binders include substances such as starch, gelatin, and sugars such as lactose, fructose, and glucose. Natural and synthetic gums, including acacia, alginates, methylcellulose, and polyvinylpyrrolidone can also be used. Polyethylene glycol, hydrophilic polymers, ethylcellulose and waxes can also serve as binders.

A lubricant can be used in a tablet formulation to prevent the tablet and punches from sticking in the die to facilitate tablet manufacture. Examples of suitable lubricants include, but are not limited to, magnesium stearate, calcium stearate, stearic acid, glycerol behenate, polyethylene glycol, talc, and mineral oil.

Disintegrants are used to facilitate dosage form disintegration or "breakup" after administration, and generally include, but are not limited to, starch, sodium starch glycolate, sodium carboxymethyl starch, sodium carboxymethylcellulose, hydroxypropyl cellulose, pregelatinized starch, clays, cellulose, alginine, gums or cross-linked polymers, such as cross-linked PVP (POLYPLASDONE® XL from GAF Chemical Corp.).

Stabilizers are used to inhibit or retard drug decomposition reactions which include, by way of example, oxidative reactions. Suitable stabilizers include, but are not limited to, antioxidants, butylated hydroxytoluene (BHT); ascorbic acid, its salts and esters; vitamin E, tocopherol and its salts; sulfites such as sodium metabisulphite; cysteine and its derivatives; citric acid; propyl gallate, and butylated hydroxyanisole (BHA).

Depending on the route of administration, the compositions can also include enteric coatings. The enteric coatings can be on the surfaces of nanoparticles, solid dosage forms, and/or semi-solid dosage forms. The enteric coating can cover all or a portion of the surface of the nanoparticles, solid dosage form, semi-solid dosage form, or a combination thereof. Suitable enteric coatings include, but are not limited to, methyl acrylate-methacrylic acid copolymers, cellulose acetate phthalate, cellulose acetate succinate, hydroxypropyl methylcellulose phthalate, hydroxypropyl methylcellulose acetate succinate, polyvinyl acetate phthalate, methyl methacrylate-methacrylic acid copolymers, cellulose acetate trimellitate, sodium alginate, zein, or a combination thereof.

III. Methods of Making and Reagents therefor

Prior to nanoemulsion preparation, continuous water and dispersed oil phase solutions are first prepared. The continuous water phase contains a thermogelling polymer. In a non-limiting example, the continuous water phase was a 5 wt % MC aqueous solution. The dispersed oil phase contains the hydrophobic therapeutic, diagnostic, prophylactic agents, or a combination thereof. In some forms, the dispersed oil phase is saturated with these hydrophobic agents. In a non-limiting example, the dispersed oil phase was a saturated fenofibrate-in-anisole solution, which was prepared by adding a drug such as fenofibrate into a solvent such as anisole until excessive drug crystals settled down in the bottle and could not be further dissolved.

To prepare the nanoemulsion, a pre-emulsion can first be prepared by vortexing a mixture of the continuous phase, dispersed phase, and, optionally, a non-ionic surfactant. In some form, the non-ionic surfactant is present. In a non-limiting example, the non-ionic surfactant is polyethylene glycol sorbitan monooleate. The pre-emulsion can then be ultrasonicated, for example, at 30% amplitude in an ultrasonicator with a 24 mm diameter horn (from Cole Parmer) at a frequency of 20 kHz for 30 min. The ultrasonicator can be kept at 10° C. using a cooling circulating water bath. If needed, a salt such as an alkali halide salt (NaCl) can be added to the as-prepared ion-free nanoemulsion and vortexed. In a non-limiting example, 0.1 g NaCl was added to the as-prepared ion-free nanoemulsion and vortexed for another 30 s.

In some forms, preparing the composition involves step (i): dripping a first composition containing a first solvent and the hydrophobic therapeutic, diagnostic, prophylactic agents, or the combination thereof, into a second composition containing a second solvent to form a mixture. These agents are in oil nanodroplets containing the first solvent. In some forms, the first composition is a nanoemulsion. In some forms, prior to dripping the first composition into the second composition, the first composition is ultra-sonicated or homogenized using an ultra-sonicator or homogenizer, respectively, as illustrated in the examples below. Subsequently, in a second step (step (ii)) the second solvent is removed from the mixture after step (i). A further step involves evaporating the first solvent from the mixture concurrently with or after step (ii), preferably in an air-circulating oven, to form nanocrystals containing the hydrophobic therapeutic, diagnostic, prophylactic agents, or a combination thereof.

Typically, the first composition is at room temperature, such as about 20° C. In some forms, the first composition contains the thermogelling polymers, and a subset of the thermogelling polymers are adsorbed on oil nanodroplets containing the first solvent.

In some forms, the first solvent is an organic solvent. Preferably, the organic solvent is a suitable pharmaceutical organic solvent, a Food and Drug Administration's Generally Regarded as Safe (GRAS) organic solvent, or a combination thereof. In some forms, the first solvent includes anisole or ethyl acetate. In some forms, the first solvent is saturated with the hydrophobic therapeutic, diagnostic, prophylactic agents, or the combination thereof. In some forms, the first composition, second composition, or both include non-ionic surfactants. In some forms, the first composition includes non-ionic surfactants. In other forms, the second composition includes non-ionic surfactants. In still other forms, the first composition and the second composition both include non-ionic surfactants. In some forms, the non-ionic surfactants include polyethylene glycol sorbitan monooleate, polyoxyethylene sorbitan monostearate, polyoxyethylene sorbitan monolaurate, polyoxyethylene sorbitan monopalmitate, polyoxyethylene sorbitan monooleate, polyoxyethylene sorbitan tristearate, polyoxyethylene monooleate, polyoxyethylene monostearate, polyoxyethylene monolaurate, polyoxyethylene sorbitan trioleate, glyceryl monostearate, sorbitan monooleate, sorbitan monolaurate, sorbitan monoisostearate, sorbitan monopalmitate, sorbitan monostearate, sorbitan sesquioleate, sorbitan trioleate, diglycerolsorbitan penta-2-ethylhexylate, diglycerolsorbitan tetra-2-ethylhexylate, or a combination thereof. In some forms, the non-ionic surfactants include a GRAS non-ionic surfactant, such as polyethylene glycol sorbitan monooleate. In some forms, the non-ionic surfactants include food grade non-ionic surfactants. Representative food grade non-ionic surfactants include lecithin, diacetyl tartaric acid esters of monodiglycerides, monodiglycerides, ethoxylated monoglycerides, and esters of fatty acids.

In some forms, the non-ionic surfactants have a hydrophilic-lipophilic balance value greater than 8.

In some forms, the first composition contains an inorganic salt. The inorganic salt includes alkali metal ions, halide ions, or both. In some forms, wherein the inorganic salt includes sodium chloride.

In some forms, the second composition includes water. Preferably, the second composition is at a temperature effective to gel the first composition. Preferably, the temperature effective to gel the first composition is less than a temperature at which crystallization of the hydrophobic therapeutic, diagnostic, prophylactic agents, or the combination thereof occurs. A temperature effective to gel the first composition can be a temperature greater than about 20° C., about 25° C., about 30° C., about 35° C., about 40° C., or about 45° C., such as 50° C., 55° C., or 70° C.

The height from which the first composition is dripped into the second composition can be a parameter for controlling the geometry of gel particles. For instance, with increasing dripping height, a larger impact force can be experienced by the droplets, and the thermogel particles can gradually evolve from spherical into unstructured shapes. Accordingly, in some forms, dripping the first composition into the second composition occurs at a drip height of between about 1 cm and about 5 cm, such as about 1 cm, about 3 cm, and about 5 cm. The drip height is measured from the tip of a dripping device to the surface of the second composition in a suitable container. In some forms, the dripping the first composition into the second composition occurs at a drip height of about 1 cm.

IV. Methods of Using

The compositions can be used to deliver an effective dosage of the hydrophobic therapeutic, diagnostic, prophylactic agents, or combination thereof, to diagnose, alleviate, prevent, or treat one or more symptoms of a disease or disorder in a subject in need thereof. The compositions can be used to administer the hydrophobic therapeutic, diagnostic, prophylactic agents, or combination thereof, locally, regionally or systemically. Administration can be via a suitable route, including, but not limited to, oral, intravenous, nasal, subcutaneous, intramuscular, intraperitoneal, dermal, transdermal, etc. A preferred route of administration is the oral route. The composition can be swallowed if administered in the form of a suspension, tablet, solution, paste, capsule, or granule.

The delivered hydrophobic therapeutic, diagnostic, prophylactic agents, or combination thereof, can be controllably released from the compositions, preferably with little to no burst release. For example, the agents can be gradually released over a period of time (e.g., hours, one day, two days, three days, a week, a month, or more). Depending on the parameters, release can be delayed or extended from minutes to days when compositions are administered under physiological conditions (a pH of about 7.4 and a temperature of about 37° C.).

The effective dosage is readily determined from the known pharmacokinetics of the hydrophobic therapeutic, diagnostic, prophylactic agents, or combinations thereof, modified in view of the kinetics measured in vitro and in animal and human clinical trials, as is routinely done by those skilled in the art. The terms "sufficient" and "effective", as used interchangeably herein, refer to an amount (e.g. mass, volume, dosage, concentration, and/or time period) needed to achieve one or more desired result(s) or alleviation of one or more symptoms of the disease or disorder.

The present invention will be further understood by reference to the following non-limiting examples.

EXAMPLES

Example 1: Design and Use of Thermogelling Nanoemulsion to Formulate Nanocrystalline Dosage Forms To bridge the gap between the use of fast-eroding thermogelling polymers, such as methylcellulose (MC), and the efficiency of formulations, such as oral drug formulation, a thermogelling nanoemulsion system was developed. It involves facile thermal processing methods for the preparation of composite particles and versatile dosage forms with hydrophobic API nanocrystals embedded in the thermogelling polymer matrix.

Materials and Methods

MC (viscosity: 15 cP, molecular weight ~14,000 g/mol), TWEEN® 80 (polysorbate, specifically polyethylene glycol sorbitan monooleate), fenofibrate, anisole, ethyl acetate, sodium chloride (NaCl), ethanol, sodium dodecyl sulfate (SDS) were purchased from Sigma-Aldrich and used without further purification steps.

(i) Synthesis of Thermogelling Nanoemulsions

Prior to nanoemulsion synthesis, continuous water and dispersed oil phase solutions were first prepared. The continuous water phase was a 5 wt % MC aqueous solution. The dispersed oil phase was a saturated fenofibrate-in-anisole solution, which was prepared by adding fenofibrate into anisole until excessive fenofibrate crystals settled down in the bottle and could not be further dissolved. To prepare the nanoemulsion, a pre-emulsion was first prepared by vortexing a mixture of the continuous phase, dispersed phase, and TWEEN® 80 in a 50-mL FALCON® conical centrifuge tube. The pre-emulsion was then ultrasonicated at 30% amplitude in an ultrasonicator with a 24 mm diameter horn (from Cole Parmer) at a frequency of 20 kHz for 30 min. The ultrasonicator was kept at 10° C. using a cooling circulating water bath. The as-prepared ion-free nanoemulsion was added with 0.1 g NaCl and vortexed for another 30 s. The parameter space for the nanoemulsion synthesis is summarized in Table 1.

TABLE 1

Exemplary nanoemulsion formulations used. The oil phase is a saturated fenofibrate-in-anisole solution.

|  | 5 wt % MC (g) | Oil phase (g) | TWEEN ® 80 (g) | NaCl (g) | Code |
|---|---|---|---|---|---|
| Vary TWEEN ® mass | 3 | 0.3 | 0 | 0.1 | No Tw80 |
|  | 3 | 0.3 | 0.01 | 0.1 | 0.01 g Tw80 |
|  | 3 | 0.3 | 0.03 | 0.1 | 0.03 g Tw80 |
|  | 3 | 0.3 | 0.05 | 0.1 | 0.05 g Tw80 |
|  | 3 | 0.3 | 0.1 | 0.1 | 0.1 g Tw80/0.3 oil/Canonical |

TABLE 1-continued

Exemplary nanoemulsion formulations used. The oil phase is a saturated fenofibrate-in-anisole solution.

| | 5 wt % MC (g) | Oil phase (g) | TWEEN® 80 (g) | NaCl (g) | Code |
|---|---|---|---|---|---|
| Vary oil phase mass | 3 | 0.3 | 0.1 | 0.1 | 0.1 g Tw80/0.3 oil/Canonical |
| | 3 | 0.6 | 0.1 | 0.1 | 0.6 g oil |
| | 3 | 0.9 | 0.1 | 0.1 | 0.9 g oil |

The droplet size and polydispersity index (PDI) of the nanoemulsion were measured by dynamic light scattering (Brookhaven NanoBrook 90Plus PALS) operated at a fixed scattering angle of 90° and a temperature of 25° C. The sample was prepared by diluting ~5 µL of the nanoemulsion solution with 3 mL deionized water in a cuvette. For each sample, five sets of one-minute measurements were done to determine the droplet size distribution.

(ii) Rheological Characterization of Nanoemulsions and Effects of Each Component on Gel Temperature Rheological properties of nanoemulsions were characterized using a stress-controlled rheometer (DHR-3, TA instrument) equipped with an upper-cone geometry (diameter=60 mm, cone angle=1.004°, and truncated gap=29 µm) and a temperature-controlled Peltier lower-plate. To minimize the evaporation, a few water drops were added on top of the cone geometry and a solvent trap was used. Before each measurement, a conditioning procedure was performed at 20° C.: a pre-shear at a constant rotational speed of 10 rad/s for 60 s, followed by an equilibration duration of 60 s. Temperature ramp measurements were conducted from 20° C. to 70° C. with a heating rate of 2° C./min, a strain amplitude of 0.1%, and frequency of 20 rad/s. Temperature jump experiments were performed from 20° C. to 70° C. with a strain amplitude of 0.1% and a frequency of 20 rad/s. Viscosities were measured with the shear rate sweeping from 1 to 1000 $s^{-1}$ at 20° C.

(iii) Preparation of Thermogel Particles

Thermogel particles were prepared by a thermal dripping method. The gelation bath was a 300-mL, 70° C. deionized water added with 0.1% w/v TWEEN® 80 to lower the surface tension. Two-three milliliters (2-3 mL) of the thermogelling nanoemulsion was loaded into a 3-mL syringe and dripped into the bath at a dripping height of 1 cm. The stirring rate was maintained at 150 rpm to enhance the heat transfer. Different dispensing tips were used to vary the particle size: smooth-flow tapered tips (14 gauge, 18 gauge, and 25 gauge) and precision stainless steel tip (30 gauge). After the dripping, the water was removed from the gelation bath until the height of the remaining water was comparable to the particle size. The gelation container carrying the particles and water thin film was quickly transferred to a 70-° C. oven and dried for 1 day to evaporate anisole and water. The dried thermogel particles were stored at room temperature before characterization and release tests.

(iv) Drug Loading Measurement

The drug loading of the dried particles was determined by a UV-Vis spectrophotometer (Thermo Scientific NanoDrop One). A concentration-absorbance calibration curve was first established using fenofibrate-in-ethanol solutions with different concentrations ranging from 0.01 to 0.5 mg/mL. From the UV-Vis absorbance spectra recorded from 150 to 850 nm, the absorbance peak values occurring at 287 nm (due to carbonyl groups of fenofibrate) was used for developing the calibration curve. For drug loading determination, dried particles were first cut into fine powders using a razor blade. Then, 10 mg fine powders were added with 3 mL ethanol, and the mixture was vortexed for 1 min. After the powders settled down by gravity, the ethanol solution was sampled and diluted ten times for UV-Vis measurements. All measurements were done in triplicate.

(v) X-Ray Diffraction (XRD) Analysis

The crystalline structures of the as-received bulk fenofibrate crystals and the fenofibrate nanocrystals in the dried particles were characterized by XRD using an in reflection mode (Philips PANalytical X'Pert Pro MPD). The samples were ground and placed on a silicon crystal zero diffraction plate. The instrument is operated at 40 kV with an anode current of 40 m with the X-ray source generated using a copper anode (Kα emission wavelength of 1.54 Å). The diffraction angle 2θ was swept from 4 to 40° with a step size of 0.01671° at a scanning rate of 2°/min.

(vi) Differential Scanning Calorimetry (DSC) Analysis

The melting points of the as-received bulk fenofibrate crystals and the fenofibrate nanocrystals in the dried particles were determined using a differential scanning calorimeter (TA Instruments Q2000). Inert environment was maintained in the sample chamber using a nitrogen gas flow at 50 mL/min. For each measurement, Tzero pans and lids were used with ~5 mg of ground sample. A temperature ramp was performed from ~10 to 150° C. at a heating rate of 10° C./min.

(vii) Scanning Electron Microscopy (SEM)

The fenofibrate nanocrystals in the dried particles were observed with high-resolution scanning electron microscope (Zeiss HRSEM) at 1 kV accelerating voltage and at a magnification of 30,000×. All samples were prepared on SEM specimen stubs with carbon tape. The SEM images were analyzed with ImageJ to estimate the nanocrystal sizes.

(viii) Drug Release Experiments

The in vitro release of the dried particles was measured using a USP Dissolution Apparatus II (Agilent Technologies VARIAN® VK 7025). A Cary 50 UV-Vis spectrometer and an in situ probe set, which were integrated in the dissolution apparatus, automatically recorded the absorbance at a wavelength of 287 nm every minute. The release medium was a 900 mL 25 mM sodium dodecyl sulfate (SDS) aqueous solution. The operating temperature and paddle rotational speed were set at 37° C. and 75 rpm, respectively. For each dissolution test, the sample mass was adjusted based on its drug loading to maintain the final fenofibrate concentration constant at 10 µg/mL. The release experiment for each sample was done in triplicate.

(ix) Preparation of Nanoparticle Suspensions

A dispersed oil phase of 0.1 g fenofibrate-in-0.3 g ethyl acetate was first prepared and added with 3 g 5 wt % MC solution and 0.1 g TWEEN® 80 for preparing the nanoemulsion. After the nanoemulsion was gelled at 50° C. in a capped vial for 5 min, the vial was uncapped to evaporate ethyl acetate until twice the mass of the added ethyl acetate (~0.6 g) was removed. The still hydrated thermogel was then redispersed into deionized water to form a MC-stabilized nanoparticle suspension. Observations of the nanoparticles were carried out using an FEI Tecnai G2 Spirit TWIN TEM equipped with a LaB6 filament, operating at an accelerating voltage of 120 kV. The nanoparticle suspensions were drop-cast onto carbon film supported copper grids (size 200 mesh), and bright-field microscopy images were taken using a Gatan CCD camera.

(x) Preparation of Drug-Loaded Tablets

A coffee bean silicone mold was first applied with a small amount of cooking oil to prevent sticking. Each slot of the mold was filled with 0.5 mL of the nanoemulsion (3 g 5 wt % MC, 0.3 g oil phase, 0.1 g NaCl). Then, the nanoemulsion was gelled and evaporated in the mold at 70° C. for one day and drug-loaded tablets were formed.

(xi) Preparation of Oral Thin Films

A poly(dimethylsiloxane) (PDMS) fragment (length by width: 1.5 cm by 1 cm) was used as a substrate for thin-film casting. A volume, 0.1 mL, of the nanoemulsion (3 g 5 wt % MC, 0.3 g oil phase, 0.1 g NaCl) was used to coat the PDMS top surface. Then, the PDMS substrate carrying the nanoemulsion thin film was transferred to a 55° C. air circulating oven with the nanoemulsion gelled and evaporated for one day. After separating from the substrate, an oral thin film was obtained.

Results (i) Synthesis of Thermogelling Nanoemulsions

To synthesize the thermogelling nanoemulsion, MC was used as both an emulsifier and gelling agent, because of its dual amphiphilic and thermoresponsive properties. Fenofibrate was chosen as a hydrophobic model API due to its extremely low water solubility (0.3 µg/mL at 37° C.) (Vogt, et al., *Eur. J. Pharm. Biopharm.* 2008, 68, 283). Anisole was used as a solvent to dissolve fenofibrate, because it is approved for pharmaceutical formulation and has a high solubility for hydrophobic APIs (Eral, et al., *Chem. Mater.* 2014, 26, 6213). The continuous water phase contained a 5 wt % MC and the dispersed oil phase was an anisole solution saturated with fenofibrate. By ultrasonicating a mixture of the water and oil phases, oil nanodroplets were formed with the MC hydrophobic units adsorbing on the droplet surface. The gelling mechanism of the MC-stabilized nanoemulsion is proposed schematically in FIGS. 1A and 1B. At low temperatures, such as at temperatures below the gel point of the thermogelling nanoemulsion, the nanodroplets were uniformly dispersed and the free MC chains were soluble in the water phase. As the temperature increased, the MC hydrophobic units associated strongly into hydrophobic junctions (Li, et al., *Langmuir* 2001, 17, 8062), forming a gel network with the oil nanodroplets locally immobilized in the gel matrix. The proposed mechanism is supported by the temperature ramp experiment with a gel point of 29° C., FIG. 1C.

Figure 1B:
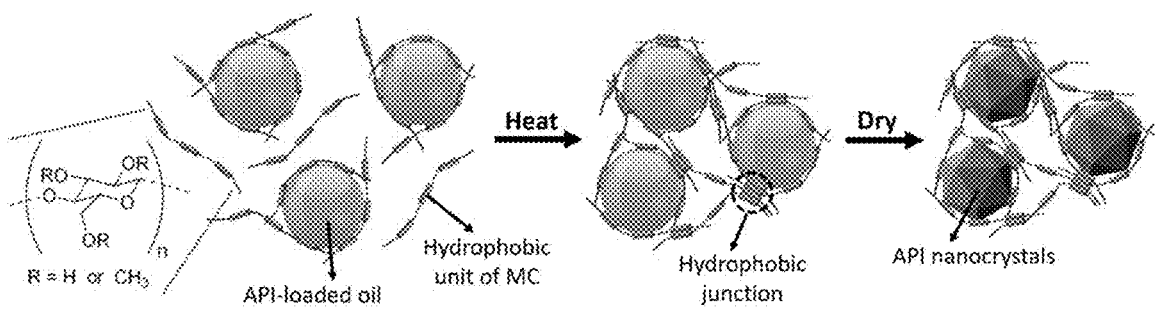
FIG. 1B shows the nanoparticles produced at each step of the method of FIG. 1A.
Figure 1C:
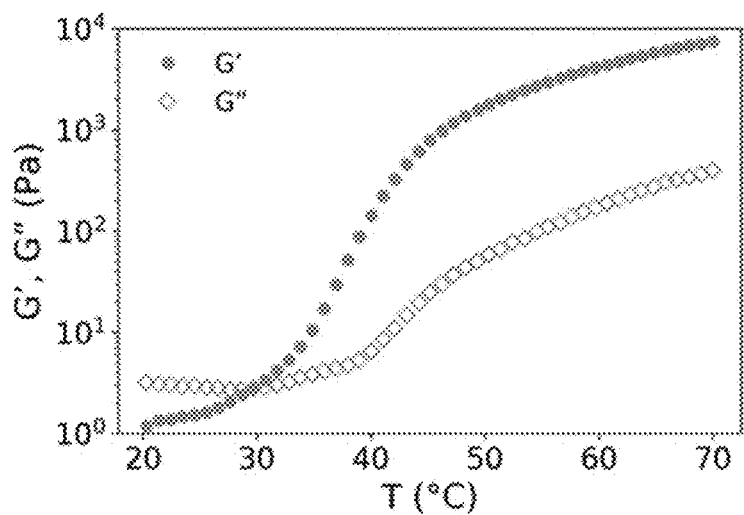
FIG. 1C shows storage modulus (G') and loss modulus (G") of the nanoemulsion (no TWEEN® 80) in a temperature ramp experiment at a heating rate of 2° C./min (0.1% strain, 20 rad/s frequency).
Figure 1D:
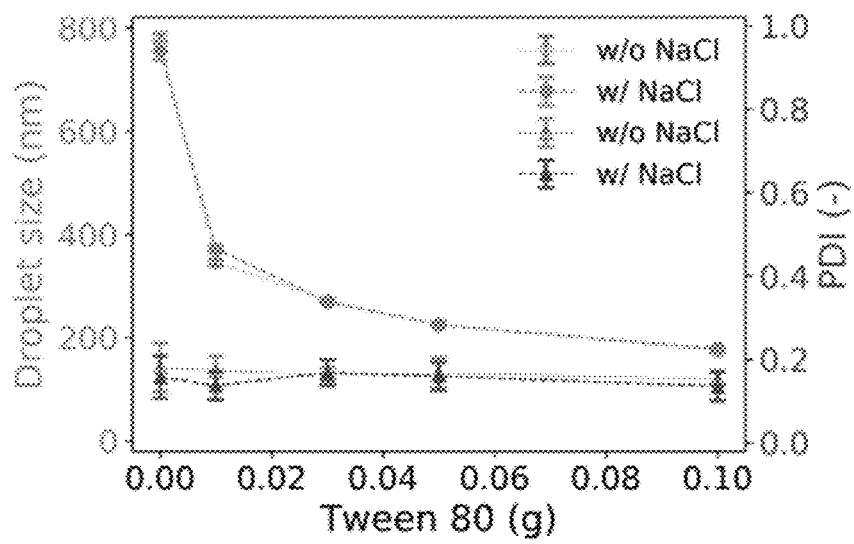
FIG. 1D is a line graph showing average droplet sizes (diameter) and polydispersity indexes (PDIs) for nanoemulsions with different TWEEN® 80 mass (0, 0.01, 0.03, 0.05, 0.1 g) before and after 0.1 g NaCl addition.
Figure 1E:
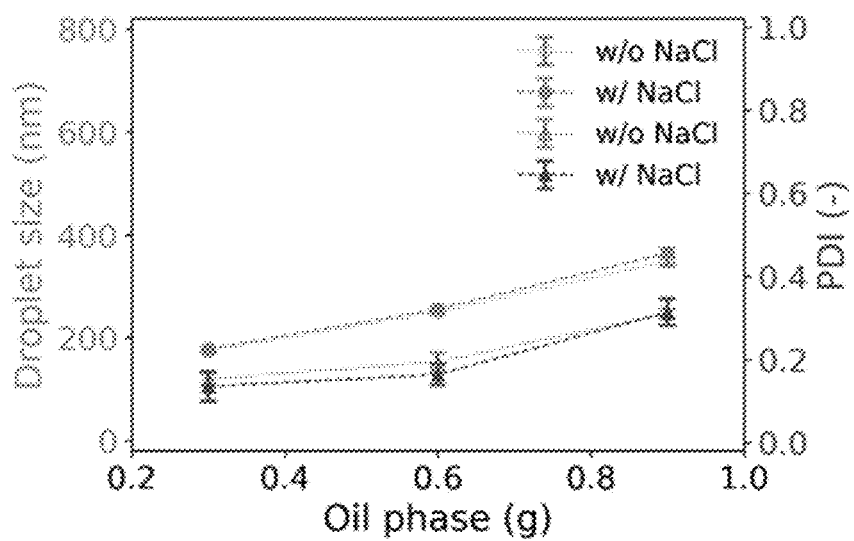
FIG. 1E is a line graph showing average droplet sizes (diameter) and PDIs for nanoemulsions with different oil phase mass (0.3, 0.6, 0.9 g) before and after 0.1 g NaCl addition.

Nanoemulsions with different formulations (Table 1) were prepared to explore the parameter space for tuning the nanoemulsion properties. Hydrophilic-lipophilic balance (HLB) of an emulsifier is one parameter that can be used to control the droplet size of an emulsion. For an anisole-in-water system, it has been reported that larger HLB values favor the formation of smaller droplets (Gupta, et al., *Langmuir* 2017, 33, 7118). MC as an emulsifier has an HLB of 10.5 (Melnik, et al., *J. Adv. Pharm. Educ. Res.* 2020, 10, 60), and TWEEN® 80 surfactant with an HLB of 15 was chosen as an additional emulsifier in an attempt increase the overall HLB of the nanoemulsion system. Introducing additional TWEEN® 80 surfactant resulted in a stronger emulsifying ability and thus the formation of smaller nanodroplets (FIG. 1D). The addition of 0.1 g TWEEN® 80 was found to effectively reduce the nanodroplet size to ~175 nm and provide excess TWEEN® 80 for increasing the oil phase in FIG. 1E.

To evaluate the effectiveness of TWEEN® 80 on the dispersed droplet formation, the surface area values occupied by a single TWEEN® 80 were estimated for different formulations and compared the results to the theoretical limiting area for a TWEEN® 80 molecule on an interface (Zdziennicka, et al., *Int. J. Mol. Sci.* 2018, 19, DOI 10.3390/ijms19071934). Assuming that all the TWEEN® 80 molecules adsorb on the oil nanodroplets in the nanoemulsion, the "effective area" occupied by one TWEEN® 80 molecule ($A_{per\ Tw80}$) can be estimated as follows:

$$N_{drops} = \frac{V_{all}}{V_{per\ drop}} = \frac{\frac{m_{oil}}{\rho_{oil}}}{\frac{1}{6}\pi d_{drop}^3} = \frac{6m_{oil}}{\rho_{oil}\pi d_{drop}^3} \tag{S1}$$

$$A_{perTw80} = \frac{N_{drops}A_{per\ drop}}{N_{Tw80}} = \frac{N_{drops}\pi d_{drop}^2}{\frac{m_{Tw80}}{M_{Tw80}}N_A} = \frac{M_{Tw80}N_{drops}\pi d_{drop}^2}{m_{Tw80}N_A} \tag{S2}$$

where $N_{drops}$ is the number of the oil nanodroplets in the nanoemulsion, $V_{per\ drop}$ is the volume of the oil phase, $m_{oil}$ is the oil phase mass, $\rho_{oil}$ is the density of the oil phase (~1.2 g/mL for a saturated fenofibrate-in-anisole solution), $d_{drop}$ is the nanoemulsion droplet diameter (experimentally determined via dynamic light scattering), $A_{per\ drop}$ is the surface area of one oil nanodroplet, $N_{Tw80}$ is the number of TWEEN® 80 molecules, $m_{Tw80}$ is the TWEEN® 80 mass, $M_{Tw80}$ is the molecular weight of TWEEN® 80 (1,310 g/mol), $N_A$ is the Avogadro constant ($6.02\times10^{23}$).

Figure 1F:
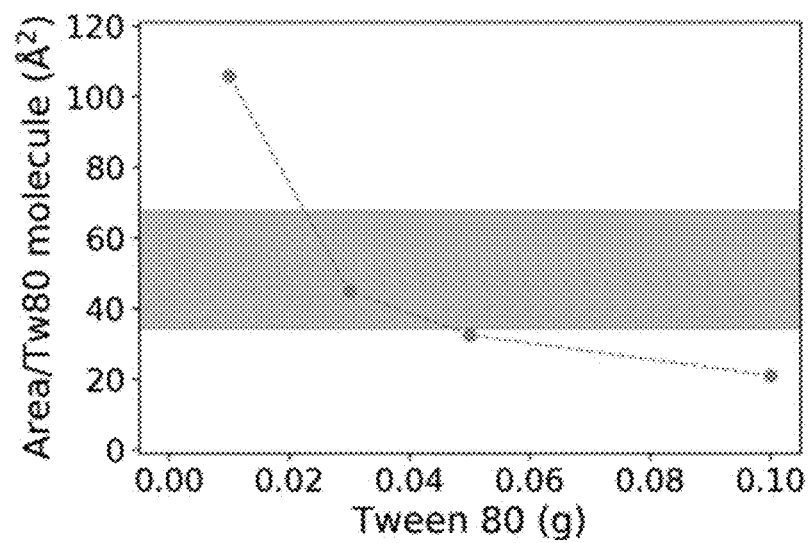
FIGS. 1F and 1G are line graphs showing estimation of the effective surface area occupied by one TWEEN® 80 molecule for nanoemulsions with different formulations.
Figure 1G:
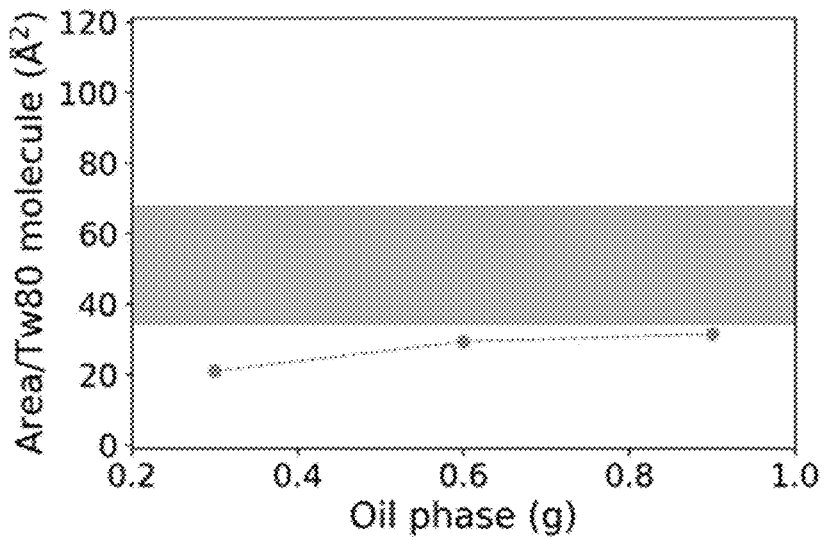

The calculated effective surface area for a TWEEN® 80 molecule decayed quickly with increasing TWEEN® 80 addition (FIG. 1F). The effective surface area per TWEEN® 80 value for 0.1 g TWEEN® 80 was below the theoretical limiting area values reported in the literature (gray region) (Zdziennicka, et al., *Int. J. Mol. Sci.* 2018, 19, DOI 10.3390/ijms19071934), indicating potential excess of free TWEEN® 80 in the system. Therefore, 0.1 g TWEEN® 80 was used to scale up the oil phase mass for a better emulsifying ability. With increasing oil phase mass (fixed 0.1 g TWEEN® 80), the occupied surface area for a TWEEN® 80 increases and leveled off at a value close to the lower bound of the theoretical limiting area values (FIG. 1G). This shows that the emulsifying limit of TWEEN® 80 could be reached with most TWEEN®80 molecules adsorbing on the nanodroplets.

Figure 1H:
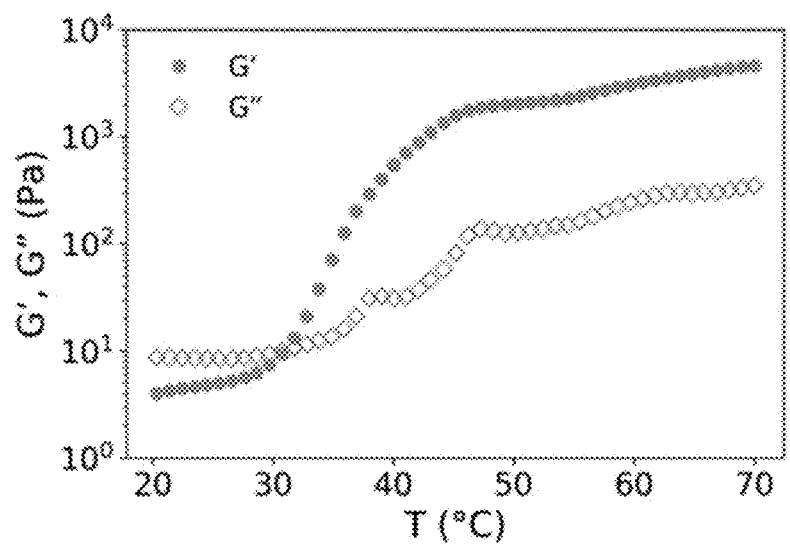
FIG. 1H shows thermal gelation property of a representative nanoemulsion (3 g MC solution, 0.3 g oil phase, 0.05 g Tween 80, 0.1 g NaCl). Storage modulus (G') and loss modulus (G") of the nanoemulsion in the temperature ramp experiment at a heating rate of 2° C./min (0.1% strain, 20 rad/s frequency). Apparent gel point is defined as the cross-over point between G' and G".
Figure 1I:
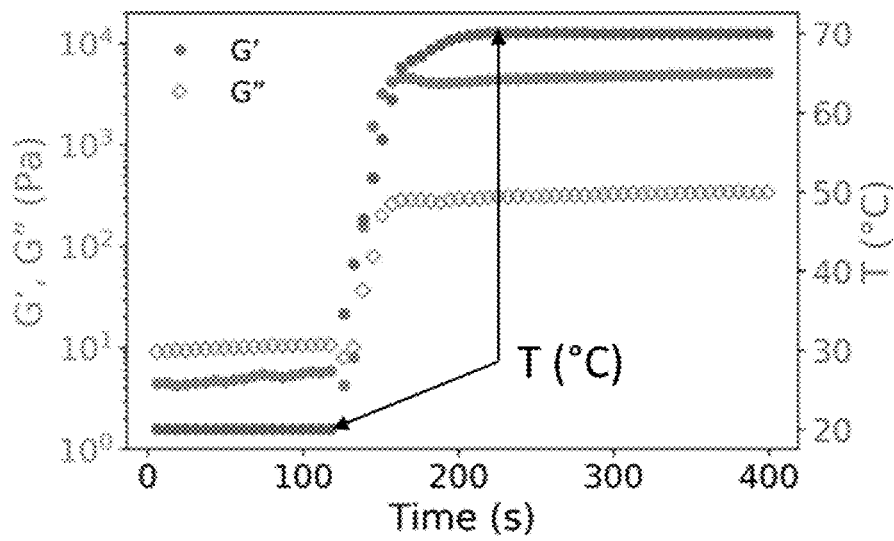
FIG. 1I shows Viscoelastic moduli of the nanoemulsion in the temperature jump experiment from a sol state (20° C.) to a gel state (70° C.) (0.1% strain, 20 rad/s frequency).

Because the nanoemulsion is stabilized by the non-ionic emulsifiers (MC and TWEEN® 80), the incorporation of NaCl into the water phase does not perturb the kinetically stable nanoemulsion. The average droplet size and polydispersity index (PDI) remain almost identical after the NaCl addition (FIGS. 1A and 1D). The good stability of the nanoemulsion to NaCl provides another parameter for potential process improvement. Cl⁻ ions (salt-out ions) can compete with MC molecules for water hydration, which facilitates and strengthens hydrophobic association of MC into a gel network for better material encapsulation (Xu, et al., *Langmuir* 2004, 20, 6134). To demonstrate the thermal gelation property, a representative nanoemulsion (3 g MC solution, 0.3 g oil phase, 0.05 g TWEEN® 80, 0.1 g NaCl) was characterized with the results shown in FIGS. 1H and 1I. The liquid nanoemulsion gels and becomes solid-like in an inverted glass vial at an elevated temperature. The apparent gel temperature is determined to be ~31° C. in the temperature ramp experiment (FIG. 1H). The effects of each nanoemulsion component on the gel temperature showed gel points below 35° C. for different nanoemulsion formulations, discussed below. Furthermore, the nanoemulsion gels quickly in response to an abrupt temperature jump (FIG. 1I). The combination of the low gel point and fast thermoresponsive nature of the nanoemulsion enables the formation of nanoemulsion thermogel with simple thermal processing.

Figure 1J:
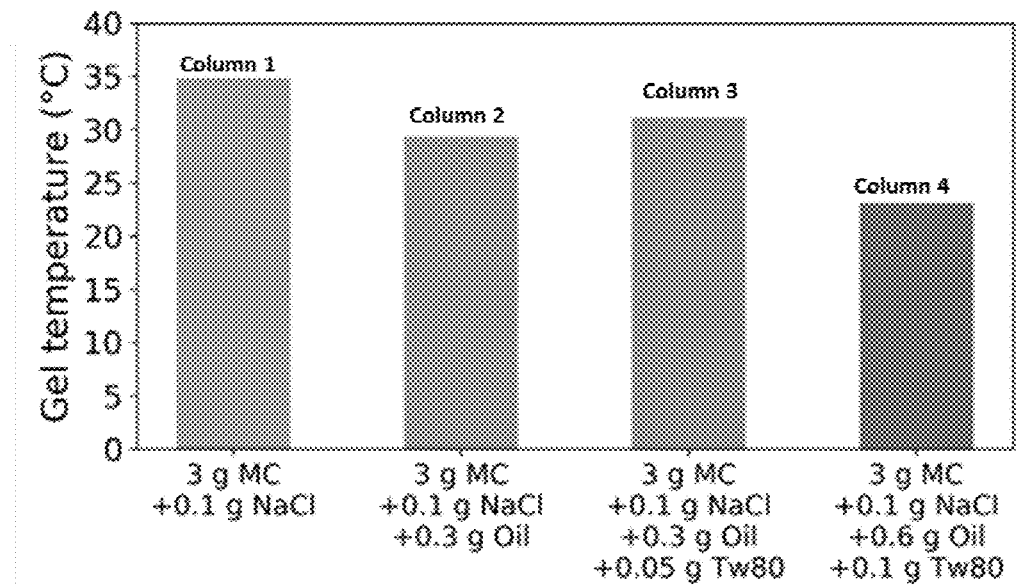
FIG. 1J is a column graph showing gel temperature of the continuous phase (column 1) and the nanoemulsions with different formulations (column 2, column 3, and column 4).

(ii) Rheological Characterization of Nanoemulsions and Effects of Each Component on Gel Temperature FIG. 1J summarizes the apparent gel point for various nanoemulsions with sequential changes in formulations. Apparent gel point is defined as the cross-over point between G' and G" at 20 rad/s frequency (0.1% strain) during a temperature ramp experiment at a heating rate of 2° C./min. Compared to the continuous water phase (column 1 in FIG. 1J), the incorporation of the oil phase (column 2 in FIG. 1J) results in a lower gel temperature. Oil nanodroplets can be considered as large hydrophobic junctions that already exist at low temperatures, such as at temperatures below the gel point of the thermogelling nanoemulsion. With the pre-formed hydrophobic junctions that provide a large surface area for further hydrophobic association upon heating, the gelation can complete more quickly and a lower gel temperature is observed. After TWEEN® 80 was added to the nanoemulsion, the gel temperature slightly increases (column 3 and column 4 in FIG. 1J). The small change in the gel temperature can be attributed to two competing factors. The addition of TWEEN® 80 reduces the nanodroplet size, providing a larger surface area for MC to adsorb and form hydrophobic junctions at low temperatures. This phenomenon should facilitate the gelation and lower the gel temperature. However, amphiphilic TWEEN®80 molecules can protect the hydrophobic units of MC chains from associating together, which delays the gelation and increases the gel temperature. Lastly, with the surfactant-to-oil (SOR) ratio fixed to have a similar emulsifying ability and droplet size, the addition of more oil phase resulted in a higher density of oil nanodroplets, providing more hydrophobic junctions that facilitate the gelation and decrease the gel point (column 3 and column 4 in FIG. 1J).

(iii) Preparation of Thermogel Particles

Utilizing the thermal gelation property of the nanoemulsion, a facile process was developed to formulate the nanoemulsion into thermogel particles by dripping the nanoemulsion into a heated water bath. The liquid nanoemulsion gels into thermogel particles in response to the sudden temperature change when contacting the water bath (FIGS. 1A and 1B).

(a) Role of Viscosity of Nanoemulsion in Particle Formation

Figure 2A:
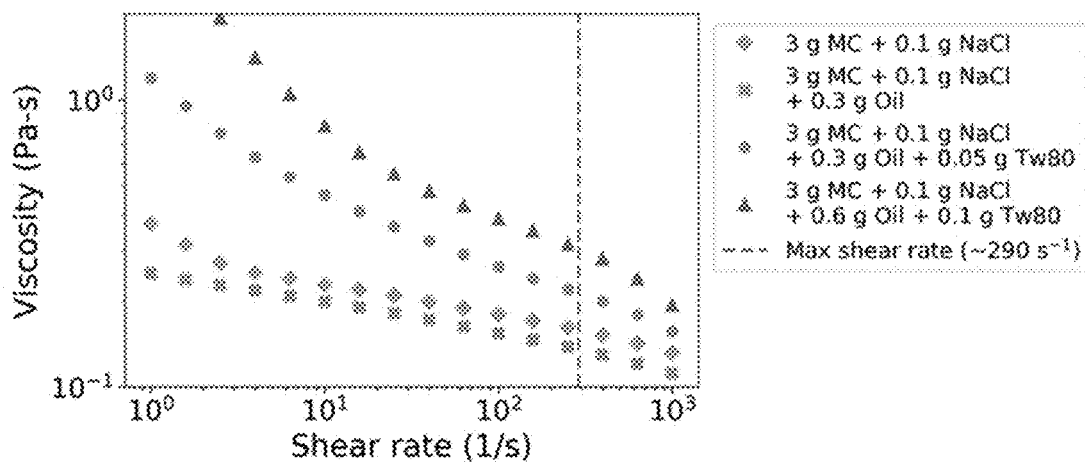
FIG. 2A shows viscosity-shear rate flow curves at 20° C. for the continuous phase and the nanoemulsions with different formulation conditions.
Figure 2B:
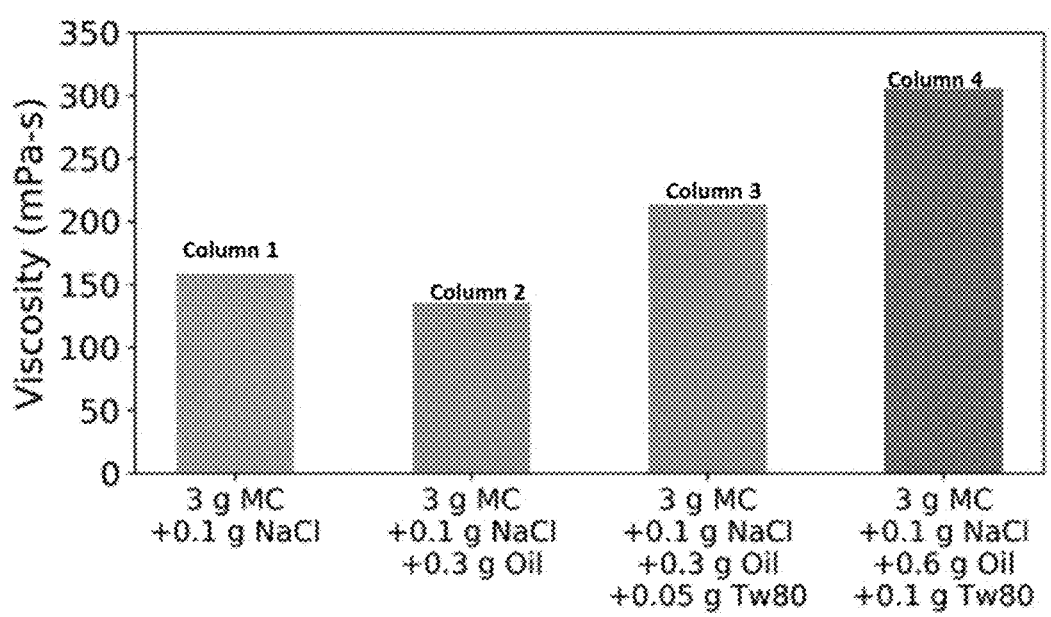
FIG. 2B is a column graph showing viscosity values at a shear rate of 290 $s^{-1}$ for the continuous phase and the nanoemulsions with different formulation conditions.

To prepare spherical particles by dripping a gelling material into a miscible gelation bath, the gelling material has to be sufficiently viscous to overcome the impact and drag forces exerted by the surrounding water (Chan, et al., *J. Colloid Interface Sci.* 2009, 338, 63). However, without any additional thickening agent, the nanoemulsion system can easily achieve a high viscosity by decreasing the droplet size and increasing the oil fraction (FIG. 2A). With the addition of 0.05 g TWEEN® 80, the nanoemulsion has a viscosity that facilitates the formation of spherical thermogel particles. FIG. 2A shows the viscosity-shear rate flow curves at 20° C. for the continuous phase and the nanoemulsions with different formulations. The observed trend for the nanoemulsion system is that decreasing the droplet size (more TWEEN® 80 addition) and increasing the oil fraction result in a higher viscosity and a stronger shear-thinning effect. In contrast to macroemulsion systems, nanoemulsions can achieve high viscosities by changes in formulations. As the dispersed droplet size reaches the nanoscale, the thickness of the adsorbed surfactant layer ($\delta$) with respect to the droplet radius ($r_{drop}$) becomes significant, leading to a higher effective dispersed phase concentration than the nominal dispersed phase concentration by a factor of $(1+\delta/r_{drop})^3$ (Tadros, *Adv. Colloid Interface Sci.* 1996, 68, 97). A prior study showed that a droplet can experience a maximal shear rate of ~290 s⁻¹ when it enters a gelation bath (An, et al., *Nat. Commun.* 2016, 7, 1). Therefore, the viscosity at 290 s⁻¹ for each condition was chosen for comparison (FIG. 2B, Table 2).

TABLE 2

Formulations and viscosities at 290 s⁻¹

| Formulation | Viscosity at 290/s (mPa·s) |
|---|---|
| 3 g MC + 0.1 g NaCl | 158.9 |
| 3 g MC + 0.1 g NaCl + 0.3 g oil | 135.6 |
| 3 g MC + 0.1 g NaCl + 0.3 g oil + 0.05 g Tw80 | 213.7 |
| 3 g MC + 0.1 g NaCl + 0.6 g oil + 0.1 g Tw80 | 306.0 |

For the nanoemulsion without the addition of TWEEN® 80 (formulation denoted by column 2 in FIG. 2B), the droplet size was relatively large (~756 nm) and the resulting viscosity is not sufficient to overcome the impact and drag forces exerted by the surrounding water in the gelation bath. In this work, a small addition of 0.05 g TWEEN® 80 was found to facilitate the formation of spherical thermogel particles. In addition to viscosity, dripping height was another parameter for controlling the geometry of gel particles. A prior study showed that for a typical dripping gelation process where a droplet penetrates into a miscible liquid, there is a competition between vortex ring evolution and gelation speed (An, et al., *Nat. Commun.* 2016, 7, 1). Mitigating vortex ring evolution and enhancing gelation speed can both favor the formation of spherical gel particles. One way to mitigate vortex ring evolution is by reducing the momentum of droplet entering the bath. In this work, a dripping height of 1 cm was found to prevent the vortex ring evolution. With increasing dripping height, a larger impact force can be experienced by the droplets, and the thermogel particles gradually evolved from spherical into jellyfish-like shapes.

In this work, 0.1 g surfactant and 0.3 g oil phase (with fixed 5 g MC solution and 0.1 g NaCl) was chosen as the canonical condition. Thermogel particles were prepared with an 18-gauge dispensing tip using the canonical condition. The hydrated particles were nearly spherical with a diameter of 2.72±0.12 mm.

(b) The Role of Temperature in the Gelation Process

Figure 2C:
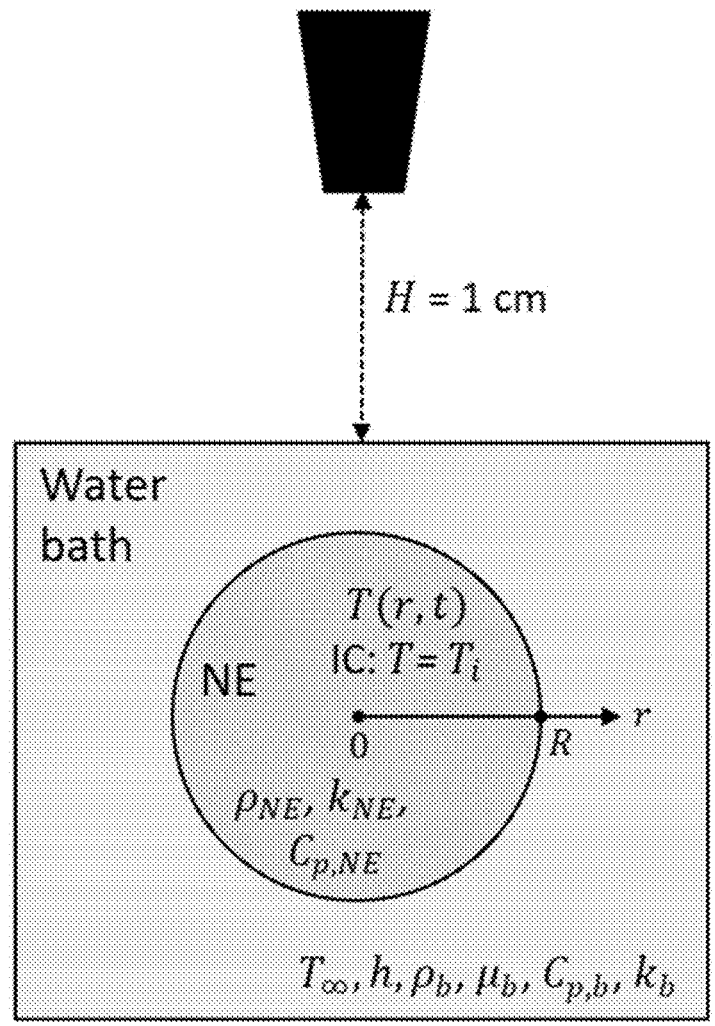
FIG. 2C is a schematic showing the one-dimensional transient conduction problem with a dripped droplet containing the nanoemulsion in a water bath.

An analysis of the time-dependent temperature profiles in a thermogel particle was performed. The thermal dripping process can be framed into a one-dimensional transient conduction problem (FIG. 2C). A dripped droplet containing the nanoemulsion is initially at $T_i=20°$ C. and enters a water bath with a constant temperature $T_\infty=70°$ C. The impact velocity ($U_0$) of a dripped droplet can be calculated using Newton's second law based on air friction and gravitational force (Pregent, et al., *J. Colloid Interface Sci.* 2009, 331, 163).

$$U_0 = \sqrt{\frac{g(1-e^{-2AH})}{A}} \quad (S3)$$

$$A = \frac{3C_f \rho_{air}}{\rho_{NR} R} \quad (S4)$$

where g is the gravitational acceleration (9.8 m/s$^2$), H is the dripping height, $C_f$ is the friction coefficient (~0.7796), $\rho_{air}$ is the air density (~1.225 kg/m$^3$), $\rho_{NE}$ is the nanoemulsion density (~1.1 g/cm$^3$), is the radius of the dripped droplet (1.36 mm for the canonical condition with an 18 gauge dispensing tip). The thermal diffusivity of the nanoemulsion ($\alpha_{NE}$) is described by:

$$\alpha_{NE} = \frac{k_{NE}}{\rho_{NE} C_{p,NE}} \quad (S5)$$

where $k_{NE}$ and $C_{p,NE}$ are the thermal conductivity and specific heat of the nanoemulsion. Because the nanoemulsion is mostly composed of water phase, the $k_{NE}$ and $C_{p,NE}$ are approximated with the properties of 20° C. water, which are 0.598 W/m-K and 4.18 kJ/kg-K.

The convective heat transfer coefficient (h) is estimated by the empirical relationship between Nusselt number (Nu), Reynolds number (Re), and Prandtl number (Pr) (Beesabathuni, et al., *J. Colloid Interface Sci.* 2015, 445, 231).

$$Nu = \frac{2hR}{k_b} = 0.69 Re^{\frac{1}{2}} Pr^{\frac{1}{3}} \quad (S6)$$

$$Re = \frac{2\rho_b U_0 R}{\mu_b} \quad (S7)$$

$$Pr = \frac{C_{p,b} \mu_b}{k_b} \quad (S8)$$

where $\rho_b$, $\mu_b$, $C_{p,b}$, and $k_b$ are the density, viscosity, specific heat, and thermal conductivity of the 70° C. water bath. Their values are 0.978 g/cm$^3$, 0.402 mPa-s, 4.19 kJ/kg-K, and 0.660 W/m-K.

The one-dimensional transient conduction problem can be described by the following differential equation in a dimensionless form:

$$\frac{\partial \theta(X,\tau)}{\partial \tau} = \frac{1}{X^2} \frac{\partial}{\partial X}\left[X^2 \frac{\partial \theta(X,\tau)}{\partial X}\right] \quad (S9)$$

where $$\theta = \frac{T-T_\infty}{T_i - T_\infty}, \tau = \frac{\alpha_{NE} t}{R^2}, \text{ and } X = \frac{r}{R}$$

are the dimensionless temperature, time, and distance from the center.
Initial condition is:

$$\theta(X,0)=1 \quad (S10)$$

Boundary conditions are:

$$\frac{\partial \theta(X=0,\tau)}{\partial \tau} = 0 \quad (S11)$$

$$\frac{\partial \theta(X=1,\tau)}{\partial \tau} = Bi \times \theta \quad (S12)$$

$$Bi = \frac{hR}{k_{NF}} \quad (S13)$$

where Bi is Biot number, also known as dimensionless heat transfer coefficient. The analytical solution to Equation S9 can be expressed by the following infinite series:

$$\theta = \sum_{n=1}^{\infty} \frac{4(\sin\lambda_n - \lambda_n \cos\lambda_n)}{2\lambda_n - \sin 2\lambda_n} e^{-\lambda_n^2 \tau} \frac{\sin\lambda_n X}{\lambda_n X} \quad (S14)$$

where $\lambda_n$'s are the roots of $$1-\lambda_n \cot\lambda_n = Bi \quad (S15)$$

Figure 2D:
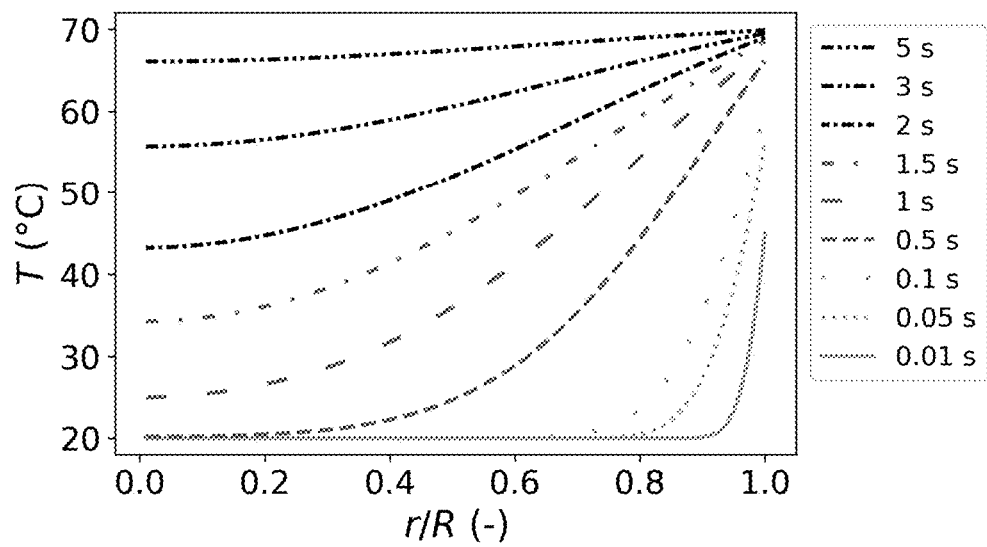
FIG. 2D is a line graph showing time-dependent temperature profiles across the radius of the droplet from 0.01 to 5 s.
Figure 2E:
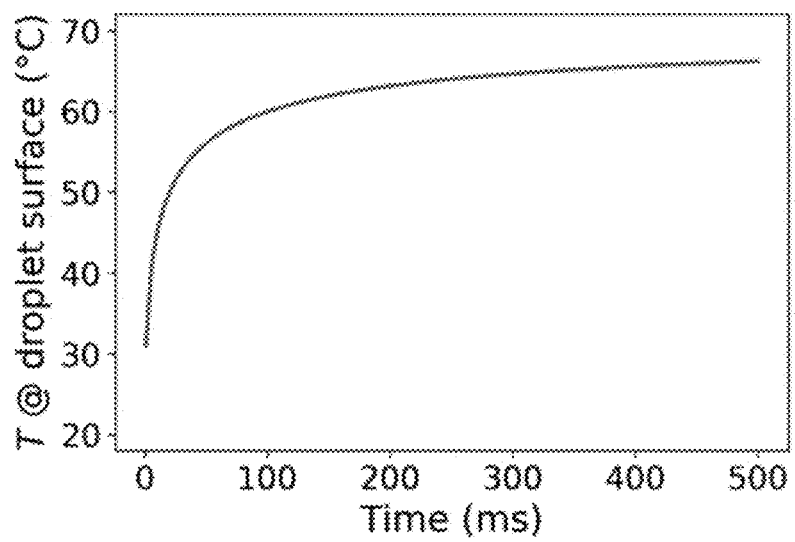
FIG. 2E is a line graph illustrating temperature at the droplet surface (r=R) within 500 ms.
Figure 2F:
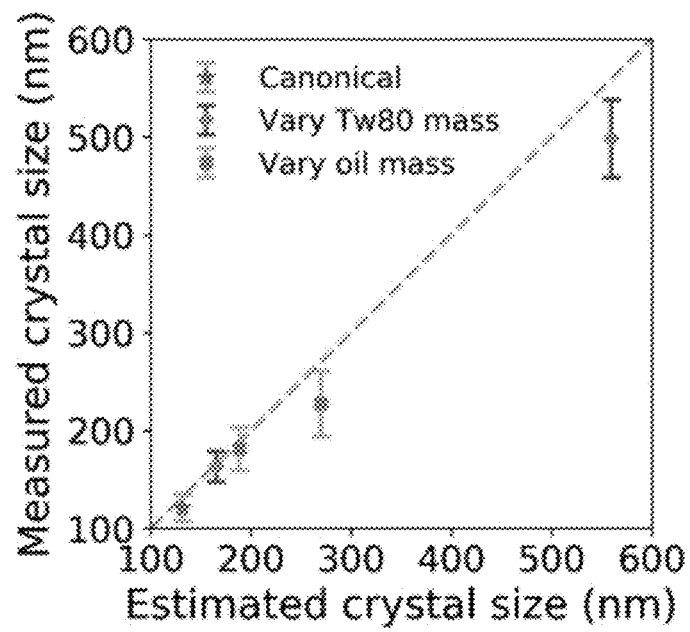
FIG. 2F is a line graph showing a comparison between measured (from the SEM images) and estimated ($d_{c,est}$ in Equation S16, described below) crystal sizes. The accuracy of the measured crystal size is limited by the embedding of nanocrystals and fusion in the polymer (e.g. methylcellulose) matrix.
Figure 2G:
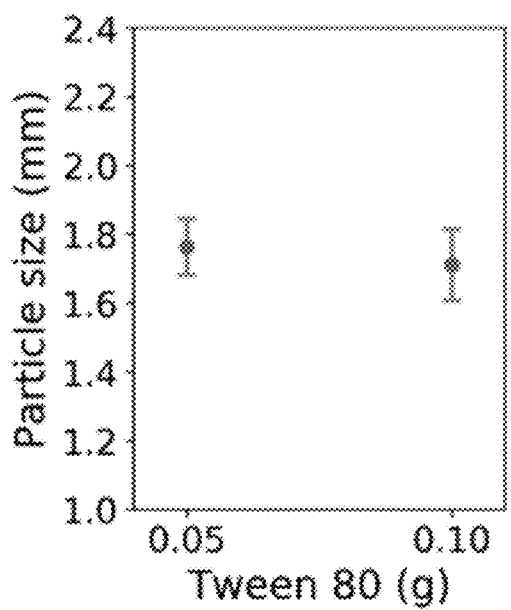
FIGS. 2G-2I show correlations between particle size and various parameters: TWEEN® 80 mass (FIG. 2G); oil phase mass (FIG. 2H); and dispensing tip outer diameter (FIG. 2I, using canonical formulation described below).
Figure 2H:
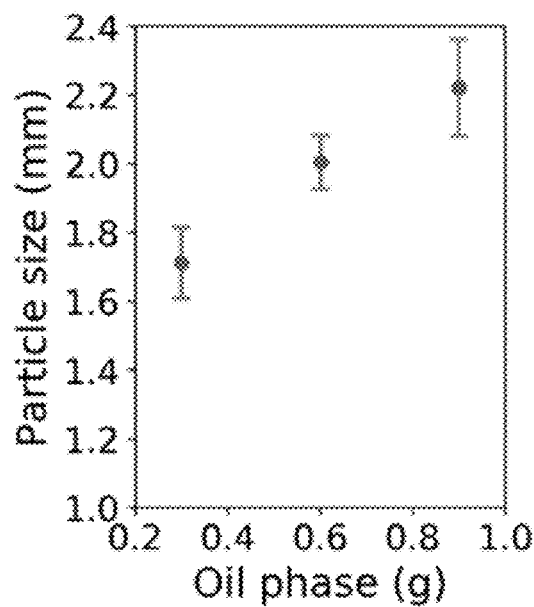

In this study, the first 100 $\lambda_n$'s were used to calculate the $\theta$, and the temperature profiles are shown in FIGS. 2D and 2E. Table 3 contains a summary of some parameters and their values.

TABLE 3

| Parameters and their values | |
|---|---|
| Parameter | Value |
| $U_0$ | 0.439 (m/s) |
| $\alpha_{NE}$ | 1.304 × 10$^7$ (m$^2$/s) |
| h | 1.231 × 10$^4$ (W/m$^2$ − K) |
| Bi | 28.03 (—) |

Solving for the transient heat transfer in the droplet, as discussed above, the droplet surface quickly gels in 10 ms, and the droplet defined by the gelled surface can completely gel in 1.5 s. Fast gelation immobilizes the oil nanodroplets and prevents material diffusion into the surrounding water bath, ensuring effective encapsulation with no leakage detectable by dynamic light scattering. Briefly, to demonstrate the effectiveness of the thermal dripping process, a turbidity test was conducted in an 80-mL clear water container at room temperature (~20° C.), which had no ability to gel the nanoemulsion. The clear cold water bath was sequentially added with the hydrated thermogel particles taken out from the hot gelation bath. The thermogel particles dissolved quickly in the cold water bath. The clear bath quickly became turbid even though the volume of a single thermogel particle was only 0.01 mL. The bath appearances after the sequential addition of 1 to 3 thermogel particles showed turbidity. Given that a small thermogel particle can change the turbidity significantly, if the thermal gelation were not effective and there was a small amount of leakage, the bath should become turbid easily. The gelation bath water after particle formation was sampled out in a cuvette for comparison. The water sample wass very clear, demonstrating the effectiveness of thermal gelation with minimal leakage. Dynamic light scattering also showed that only TWEEN® 80 micelles could be detected with an average size of 11.13±0.85 nm (PDI=0.144±0.039). A small amount of TWEEN® 80 was added before particle formulation to lower the surface tension of the gelation bath.

After gelation, the bath water volume was adjusted until the water film thickness was comparable to the particle size, and then the gelation container was directly dried in a 70° C. oven without any additional washing step. During the drying, the oil nanodroplets were immobilized in the MC network and defined individual crystallization domains, locally inducing API nanocrystals embedded in the dried MC matrix (FIGS. 1A and 1B). The dried thermogel particles (canonical condition) had a particle size of 1.71±0.10 mm, corresponding to 75% volume shrinkage of the hydrated particles.

(c) The Role of Inorganic Ions in Particle Formulation

The role of NaCl addition was demonstrated in a control experiment in which the resulting dried particles without NaCl addition buckle due to weak MC hydrophobic association. Cl⁻ ions are salt-out ions that can facilitate and strengthen the hydrophobic association (Xu, et al., *Langmuir* 2004, 20, 6134), which plays a role in the formation of thermogel particles. The ions can compete with MC molecules for water hydration; therefore, the addition of NaCl leads to a poorer solubility of MC in water and a stronger hydrophobic association. For the salt-free nanoemulsion (canonical condition without NaCl), the resulting dried particles buckle and are flat, suggesting that the inorganic ions can enhance particle formation.

(d) Observing Nanocrystal Size and Nanoparticle Size

Figure 3A:
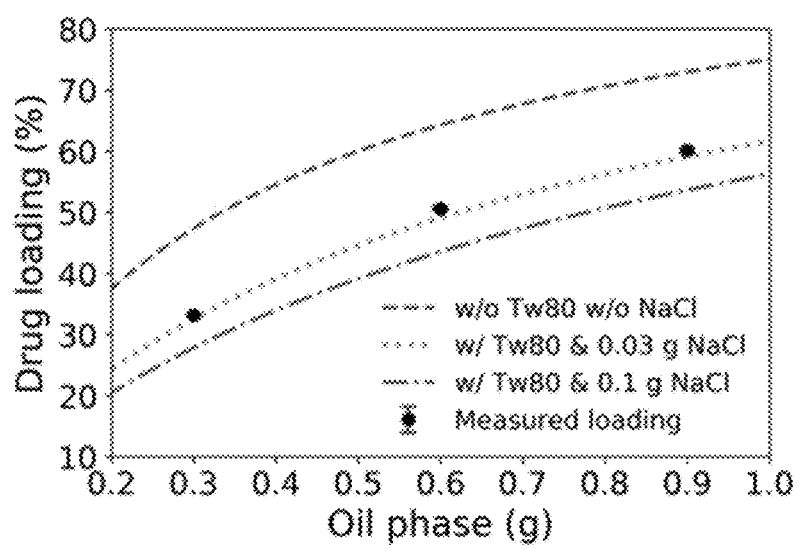
FIGS. 3A and 3B are line graphs showing characterization of the fenofibrate nanocrystals in the dried API-loaded particles.

To observe the confined crystallization enabled by the nanoemulsion templating, SEM imaging was performed on dried API-loaded particles and pristine MC particles without drug. Compared to the pristine MC matrix, the API-loaded particles showed clear evidence of embedded nanocrystals in the matrix. The observed nanocrystals have a diameter of 120.6±13.6 nm, which was similar to the predicted nanocrystal diameter (~131.7 nm) based on the oil nanodroplet size and API properties. Briefly, by balancing the fenofibrate mass in a nanodroplet and in a nanocrystal, the size of a nanocrystal can be estimated as follows:

$$d_{c,est} = \left(\frac{C_{fen}}{\rho_o}\right)^{\frac{1}{3}} d_{drop} \tag{S16}$$

where $d_{c,est}$ is the estimated nanocrystal diameter, $C_{fen}$ is the fenofibrate-in-anisole concentration (~0.48 g/mL (Domenech and Doyle, *Chem. Mater.* 2020, 32, 498)), $\rho_c$ is the nanocrystal density (1.2 g/cm$^3$=1.2 g/mL), and $d_{drop}$ is the nanoemulsion droplet diameter. For different nanoemulsion formulations, the observed nanoparticle size in the MC matrix followed the estimated nanocrystal size (FIG. 2F), providing evidence of confined crystallization in the nanodroplets.

The sizes of the dried particles were also investigated for different formulations (FIGS. 2GH, 2H, and 2I). With the same dispensing tip size, the particle size increases with increasing oil phase mass because a higher oil fraction can create a higher solid content after drying (FIG. 2H). With the same nanoemulsion formulation, the particle size can be effectively controlled by varying the dispensing tip diameter (FIG. 2I, Table 4), and the correlation can be well described by the Tate's law:

$$d_{particle} = \propto \left(\frac{d_T Y_{NE}}{\rho_{NE} g}\right)^{\frac{1}{3}} \tag{S17}$$

where $d_{particle}$ is the dried particle diameter, $d_r$ is the tip outer diameter, $Y_{NE}$ and $\rho_{NE}$ are the surface tension and density of the nanoemulsion, g is the gravitational acceleration (9.8 m/s$^2$). For the same nanoemulsion formulation, the $d_{particle}$ is proportional to the cube root of the $d_r$, as shown in FIG. 2J.

TABLE 4

Specifications of the dispensing tips used in this work. The outer diameter (O.D.) of the smooth-flow tapered tips are measured with a caliper.

| Gauge | Type | I.D. (mm) | O.D. (mm) |
|---|---|---|---|
| 14 | Smooth-flow tapered tip | 1.54 | 1.97 |
| 18 | Smooth-flow tapered tip | 0.84 | 1.26 |
| 25 | Smooth-flow tapered tip | 0.25 | 0.68 |
| 30 | Precision stainless steel tip | 0.15 | 0.30 |

(iv) Drug Loading Measurement

Strategies to increase API loading in a drug product are important, because of the great interest to develop smaller drug products for better patient compliance. However, iterative experimentation of multiple processing steps are generally required for formulations, such as oral drug formulations, with high drug loadings (Cai, et al., *Int. J. Pharm.* 2013, 441, 790).

A concentration-absorbance calibration curve was developed to measure the drug loadings of the dried API-loaded particles using UV-Vis spectroscopy (FIGS. 3A and 3B). In addition, the drug loadings can be estimated using Equation S18 for comparison. Because TWEEN® 80 and NaCl do not form hydrophobic junctions with MC upon heating, they are considered removable and should be able to diffuse out of the thermogel particles in the heated water bath. To account for this, the retention rates for both TWEEN® 80 and NaCl were introduced.

$$\phi_{FEN} = \frac{m_o w_{FEN}}{m_c w_{MC} + m_o w_{FEN} + \varsigma_{Tw80} m_{Tw80} + \varsigma_{NaCl} m_{NaCl}} \tag{S18}$$

where $\phi_{FEN}$ is the estimated drug loading, $m_o$ is the oil phase mass, $W_{FEN}$ is the fenofibrate weight fraction in the oil phase (~45 wt % (Domenech and Doyle, *Chem. Mater.* 2020, 32, 498)), $m_c$ is the mass of the continuous water phase, $W_{MC}$ is the MC weight fraction in the water phase (5 wt %), $\zeta_{Tw80}$ is the retention rate of TWEEN® 80 in the dried particles, $m_{Tw80}$ is the TWEEN® 80 mass, $\zeta_{NaCl}$ is the retention rate of NaCl in the dried particles, and $m_{NaCl}$ is the NaCl mass. FIG. 3A shows the drug loadings of the dried API-loaded particles as a function of the oil phase mass. The measured drug loadings fell between the theoretically maximal (dashed curve) and minimal (dash-dotted curve) values, and the loading curve with 100% and 30% retention for TWEEN® 80 and NaCl (dotted curve) was found to well describe the measured drug loadings.

Figure 3B:
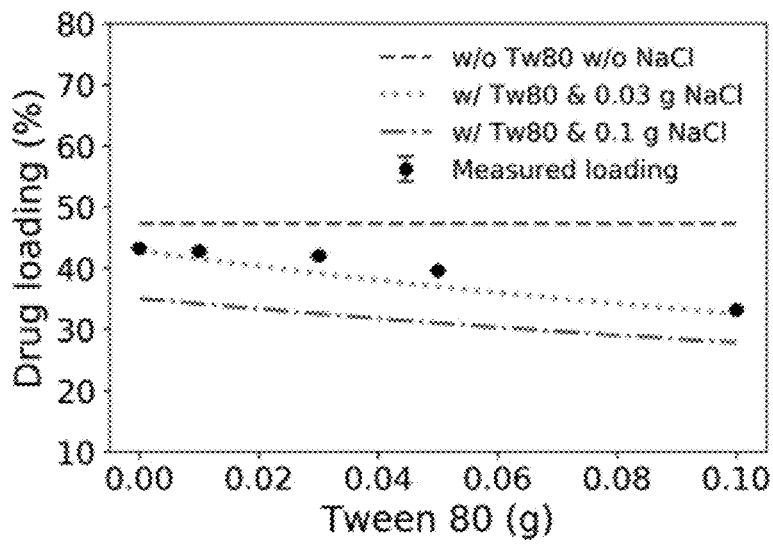

The theoretically maximal (dashed curve with $\zeta_{Tw80}=0$ and $\zeta_{NaCl}=0$) and minimal (dash-dotted curve with $\zeta_{Tw80}=1$ and $\zeta_{NaCl}=1$) drug loadings were first determined for complete removal and retention for the two species. The measured drug loadings fell in the region between these two curves (FIGS. 3A and 3B). To deconvolute the retentions for the two species, the retention rate of NaCl for the nanoemulsion without TWEEN® 80 addition (0 g TWEEN® 80 in FIG. 3B) was first analyzed. A $\zeta_{NaCl}$ of ~0.3 was calculated to match the measured drug loading for this condition. Assuming the effective diffusivity of NaCl was roughly constant for different formulations, because the gel matrices were formed with the same continuous phase, a drug loading curve was plotted with $\zeta_{Tw80}=1$ and $\zeta_{NaCl}=0.3$ for different formulations (dotted curve), and a good consistency between the measured and estimated drug loadings was found (FIGS. 3A and 3B). The result showed that TWEEN® 80 was still retained on the dried particles. Compared to small NaCl ions which are free to move, TWEEN® 80 molecules are mostly anchored on the oil-water interface, preventing them from diffusing out. In addition, the bulky molecular structure of TWEEN® 80 renders the diffusion difficult even if there are free TWEEN®80 molecules.

With the nanoemulsion system described herein, the drug loading can be easily scaled up by adding more oil phase without any optimization required of the formulation and process.

(v) X-Ray Diffraction (XRD) Analysis and Differential Scanning Calorimetry (DSC) Analysis X-ray diffraction (XRD), Raman spectroscopy, and differential scanning calorimetry (DSC) were used to characterize the polymorphism and crystallinity of the fenofibrate nanocrystals in the particles. DSC is a powerful tool that can be used to identify fenofibrate polymorphs based on their different melting points.

Figure 4A:
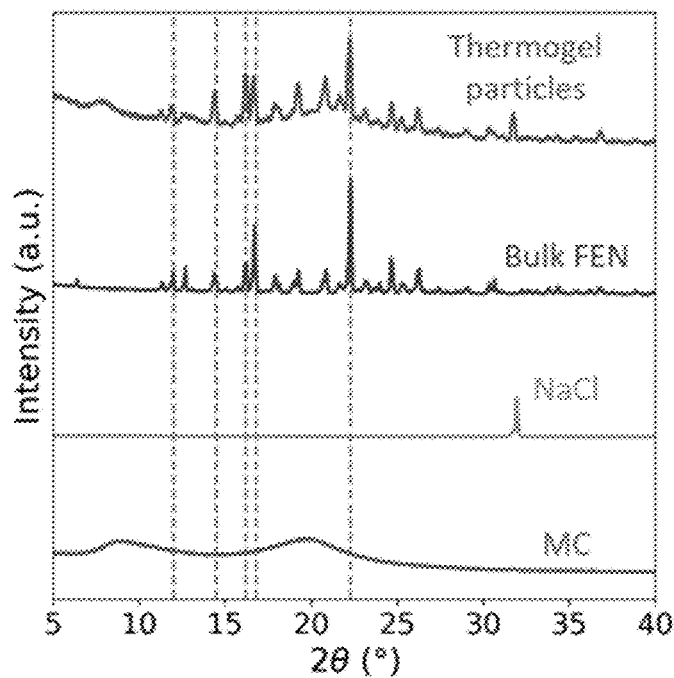
FIG. 4A is a line graph showing x-ray patterns of the fenofibrate nanocrystals in the dried API-loaded particles, as-received bulk fenofibrate, NaCl, and methylcellulose.
Figure 4B:
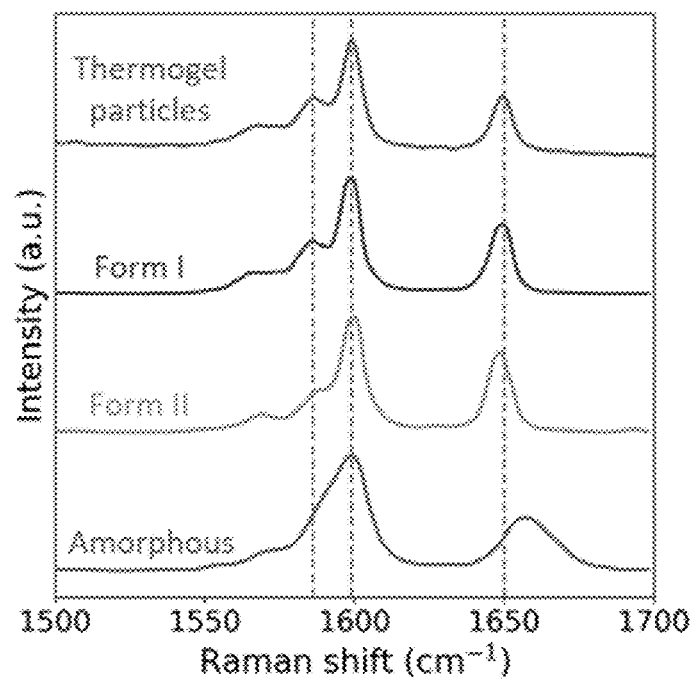
FIG. 4B is a line graph showing high frequency Raman spectra of the fenofibrate nanocrystals in the dried particles (this work) and three reference solid-state forms of fenofibrate reported in the literature (Ying, et al., *J. Raman Spectrosc.* 2017, 48, 750).

The XRD patterns in FIG. 4A show that the nanocrystals in the dried particles share the same characteristic peaks of the bulk fenofibrate crystals, which corresponds to crystalline form I (Heinz, et al., *Eur. J. Pharm. Biopharm.* 2009, 71, 100). In FIG. 4B, the high frequency spectrum (1500 to 1700 cm$^{-1}$) for the fenofibrate nanocrystals in the dried particles (canonical condition) is compared with the spectra for form I, form II, and amorphous fenofibrate. The solid-state form of the fenofibrate nanocrystals was identified to be crystalline form I by matching the three peaks at 1586, 1599, and 1650 cm$^{-1}$. The first two wavenumbers correspond to the stretching of in-plane benzene ring, and the 1650 cm$^{-1}$ corresponds to the C=O stretching (Heinz, et al., *Eur. J. Pharm. Biopharm.* 2009, 71, 100).

Figure 4C:
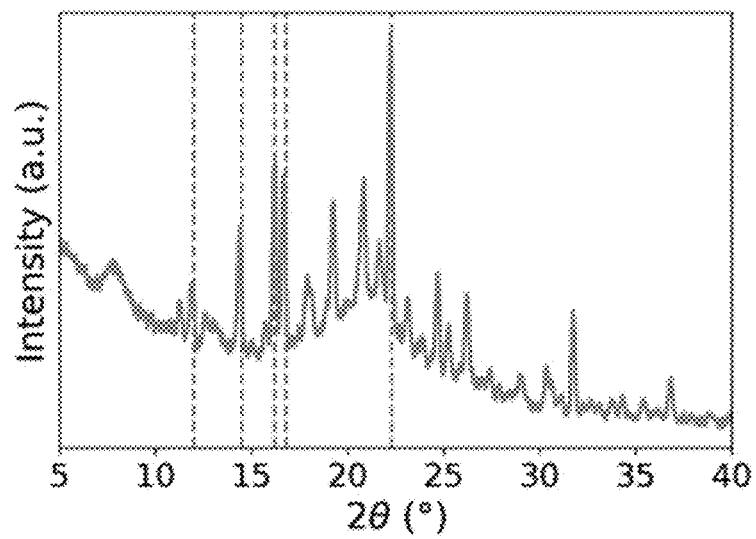
FIGS. 4C and 4D are line graphs showing x-ray pattern (FIG. 4C) and a Raman spectrum (FIG. 4D) of the fenofibrate nanocrystals in the particles. The inset in FIG. 4D is the zoomed-in high frequency Raman spectrum. The dashed lines and dots indicate the characteristic peaks for crystalline form I fenofibrate.
Figure 4D:
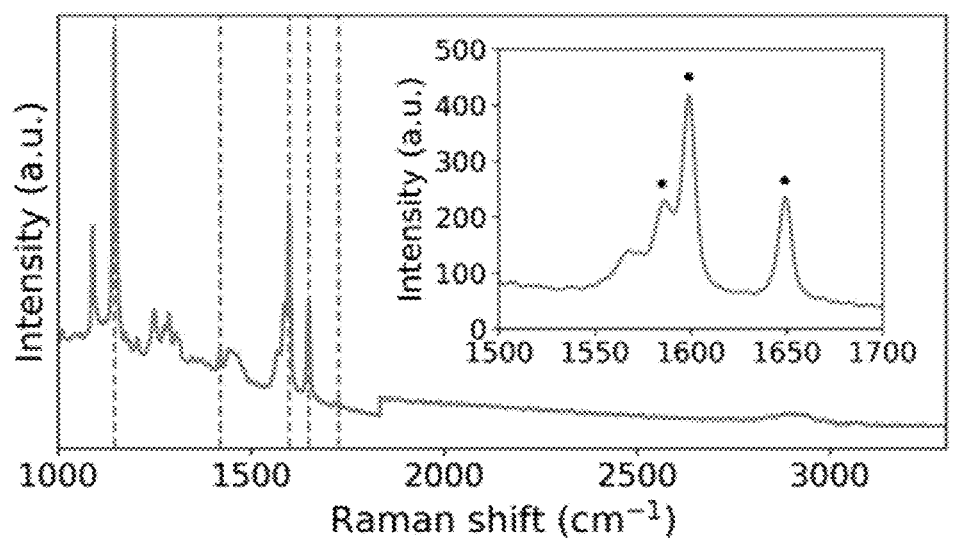

The XRD pattern in FIG. 4C confirmed the existence of fenofibrate nanocrystals in the particles, with the characteristic peaks aligning with those of crystalline form I fenofibrate at the diffraction angles (2θ) of 12°, 14.5°, 16.2°, 16.8°, and 22.4° (Heinz, et al., *Eur. J. Pharm. Biopharm.* 2009, 71, 100). Form I fenofibrate is a desirable form because of its thermodynamic stability compared to the metastable form II and amorphous counterparts. The Raman spectrum also supported the data showing that the fenofibrate nanocrystals were form I polymorph (FIG. 4D and FIG. 4B) (Heinz, et al., *Eur. J. Pharm. Biopharm.* 2009, 71, 100; Ying, et al., *J. Raman Spectrosc.* 2017, 48, 750).

Figure 5A:
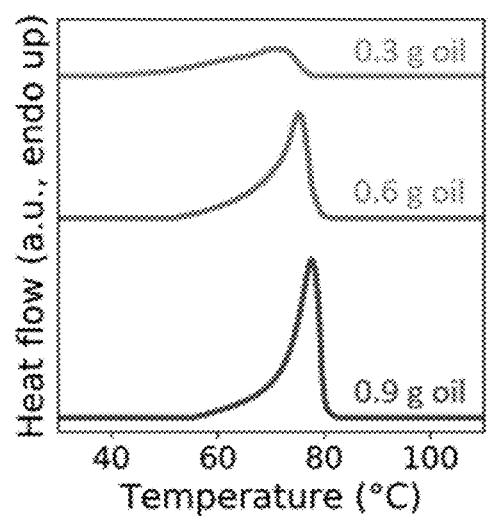
FIGS. 5A and 5B are line and column graphs, respectively, showing differential scanning calorimetry (DSC) thermograms (FIG. 5A) and crystallinity (FIG. 5B) of the fenofibrate nanocrystals in the particles for different oil phase mass.
Figure 5B:
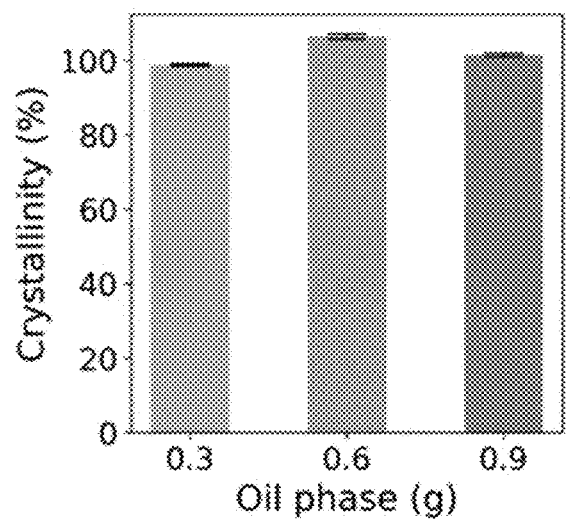
Figure 5C:
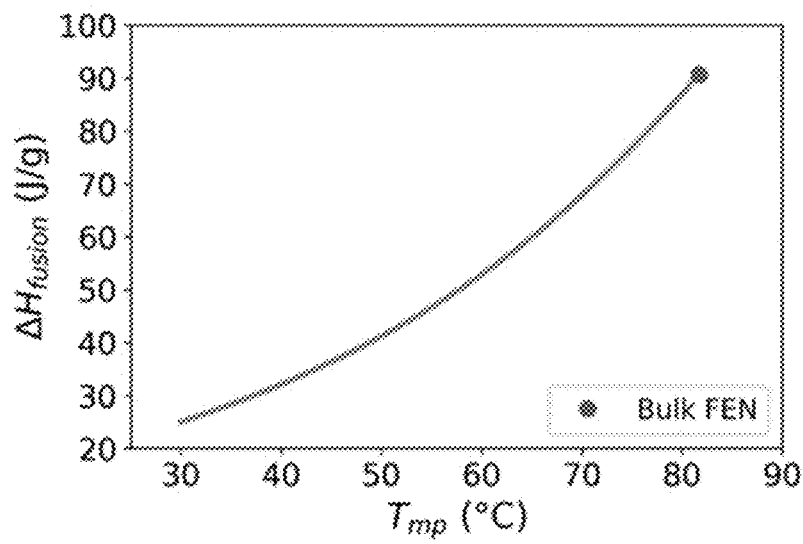
FIG. 5C is a line graph showing the correlation between the enthalpy of fusion and melting point for fenofibrate nanocrystals. The plot is generated with the data from the previous work (Dwyer, et al., *CrystEngComm* 2015, 17, 7922; Godfrin, et al., *Small* 2019, 15, 1).

Differential scanning calorimetry (DSC) analyses not only showed the presence of fenofibrate nanocrystals with a single endothermic peak of melting (FIG. 5A), but also showed a high degree of crystallinity (—100% in FIG. 5B) approximated with the prior knowledge of decreasing fusion enthalpy for lower melting points (Godfrin, et al., *Small* 2019, 15, 1; Dwyer, et al., *CrystEngComm* 2015, 17, 7922) (see Section S11 in Supporting Information). Prior studies have shown that reduction of fenofibrate crystal size leads to decreasing melting point and heat of fusion (Dwyer, et al., *CrystEngComm* 2015, 17, 7922; Godfrin, et al., *Small* 2019, 15, 1). The correlation between the melting point and heat of fusion data was plotted in FIG. 5C. The crystallinity ($\Gamma_{FEN}$) of the fenofibrate nanocrystals in the dried API-loaded particles can be estimated by calculating the ratio of the fenofibrate nanocrystal mass ($m_{FEN,DSC}$) to the optimal fenofibrate mass ($m_{FEN,opt}$).

$$\Gamma_{FEN} = \frac{m_{FEN,DSC}}{m_{FEN,opt}} \times 100\% \tag{S19}$$

$$m_{FEN,DSC} = \int_{-\infty}^{\infty} \frac{\dot{H} \times m_{sample}}{\dot{T} \times \Delta H_{fusion}} dT_{mp} \tag{S20}$$

$$m_{FEN,opt} = m_{sample} \times \phi_{FEN} \tag{S21}$$

where $\dot{H}$ is the specific heat flow (W/g), $m_{sample}$ is the sample mass of the crushed particles for the DSC measurement (g), $\dot{T}$ is the heating rate (° C./s), $\Delta H_{fusion}$ is the enthalpy of fusion (J/g), $\phi_{FEN}$ is the drug loading determined by UV-Vis spectroscopy. Both the $\dot{H}$ and $\Delta H_{fusion}$ are a function of melting point $T_{mp}$.

Figure 5D:
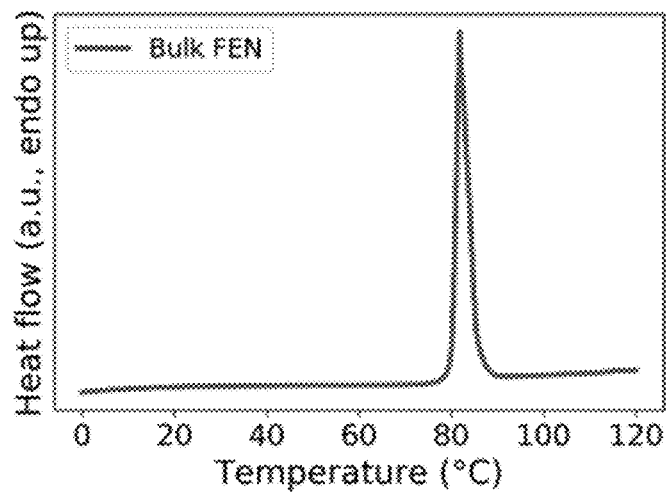
FIG. 5D is a line graph showing a DSC thermogram of the as-received bulk fenofibrate crystals.
Figure 5E:
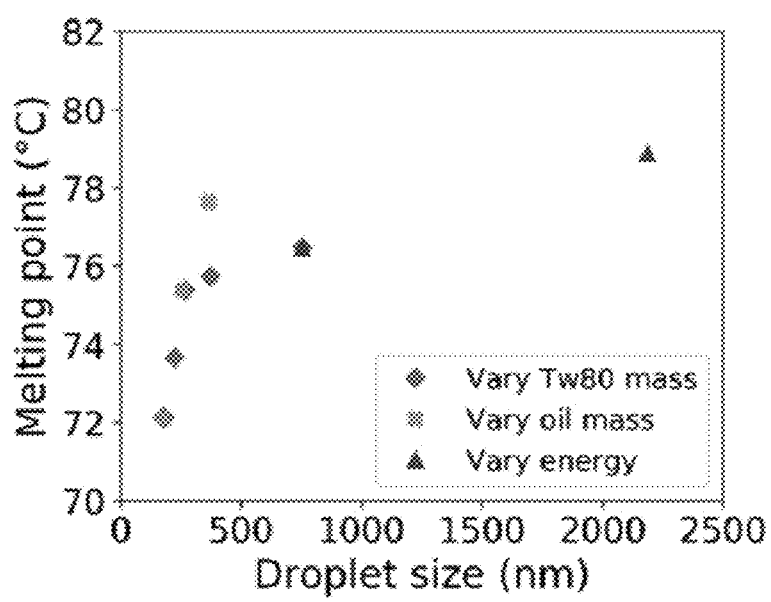
FIG. 5E is a graph showing correlation between the melting point and droplet size.
Figure 5F:
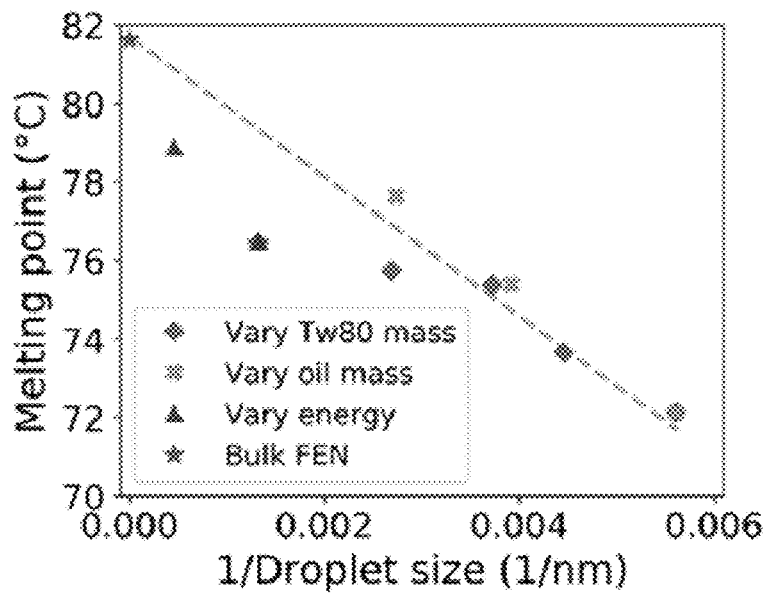
FIG. 5F is a graph showing a correlation between the melting point and the reciprocal of droplet size. The bulk fenofibrate is assumed to be templated by an infinitely large droplet (1/droplet size~0).

The Gibbs-Thomson equation predicts that melting point depression becomes more significant for smaller nanocrystals. Compared to the as-received bulk fenofibrate crystals with a melting point of 81.7° C. (FIG. 5D), the nanocrystal melting point decreased with decreasing nanoemulsion droplet size (FIG. 5E). The observed melting point of 81.7° C. corresponds to crystalline form I polymorph. For all the formulations in this study (FIGS. 5A, 4A, and 4B), no exothermic signal was observed for the fenofibrate nanocrystals in the dried particles, indicating no crystallization of amorphous fenofibrate during the measurement. The melting point depression showed the effectiveness of nanoemulsion droplets for templating API nanocrystals. Moreover, a linear trend was observed between the melting point and the reciprocal of the droplet size (FIG. 5F). In a prior study, this linear trend was predicted and experimentally realized by carefully confining API crystallization in the nanopores of commercial pore glass (Dwyer, et al., *CrystEngComm* 2015, 17, 7922). However, unlike the rigid templates that are limited to certain specifications, "soft" templates facilitated by the nanoemulsion provide a flexible approach to simultaneously control the drug crystal size and the drug loading (i.e., crystal density) for designing a wide range of drug products.

(vi) Drug Release Experiments

Figure 6A:
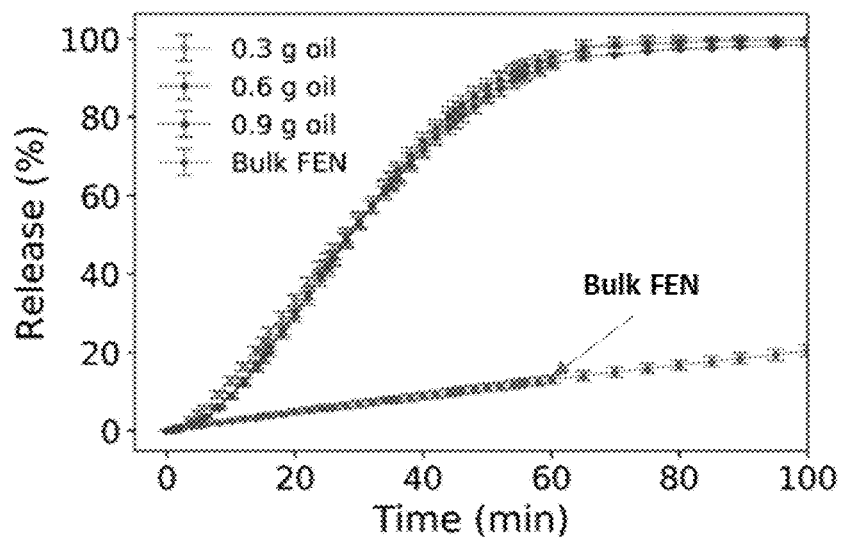
FIGS. 6A-6K are line graphs showing release performance and analyses of the dried API-loaded particles.
Figure 6B:
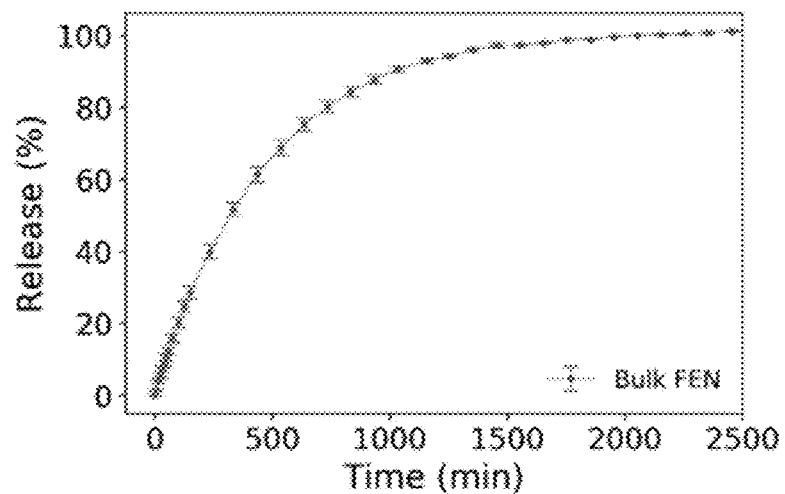
Figure 6C:
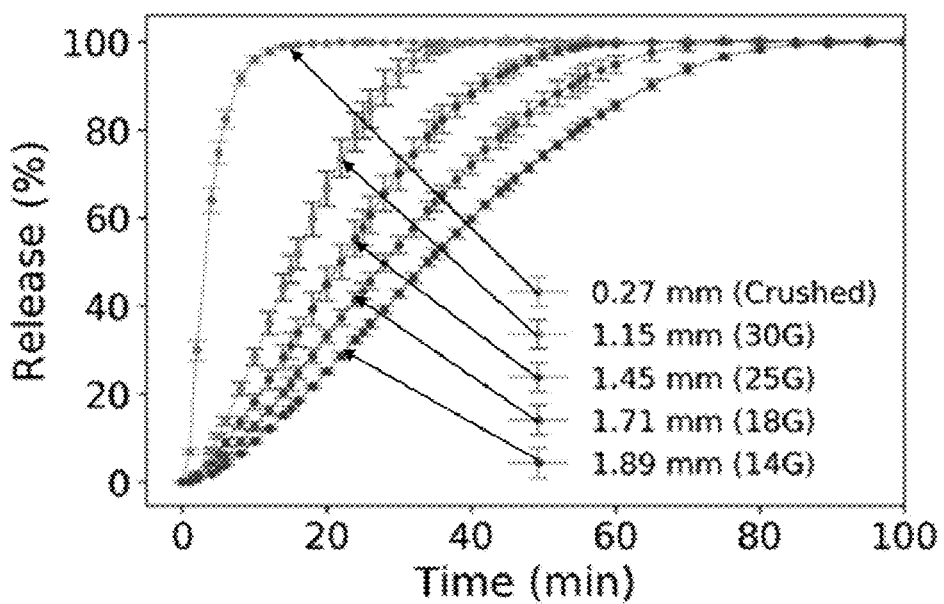
Figure 6D:
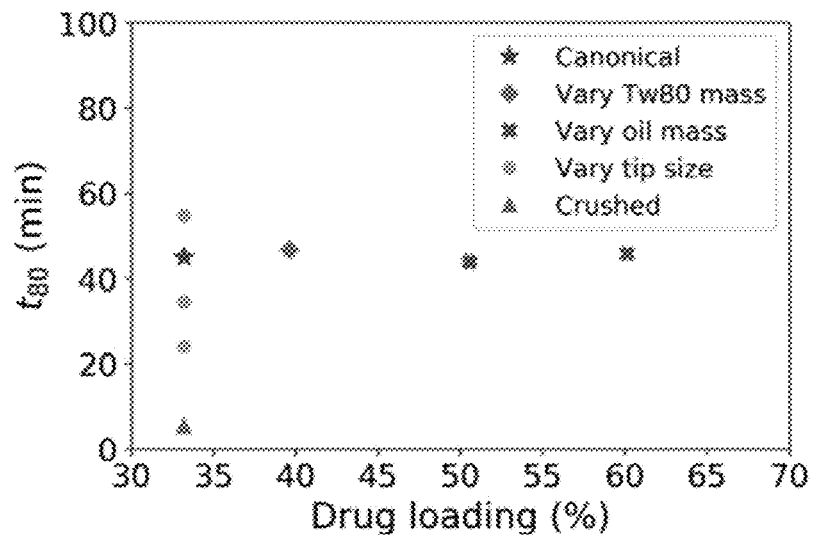

The release performance of the API-loaded dried particles was evaluated and compared to that of bulk fenofibrate crystals (FIG. 6A and complete release profile in FIG. 6B). The bulk crystals with a size of 239.6 μm are nearly insoluble. It took 12.1 hours to reach 80% release and another 19.4 hours to reach complete release. All the nanocrystal-loaded particles showed a significantly faster release (FIGS. 4A, 4B, and 4C). For different oil phase mass, the release profiles were nearly identical (FIG. 6A), which was ideal for maintaining the release performance when the drug loading was increased. In FIG. 6C, varying the particle size for the same nanoemulsion was shown to be an effective approach to control the release profile, with the reduction of particle size accelerating the drug release. Furthermore, the crushed particles with a similar size distribution as the bulk fenofibrate crystals showed a very fast drug release, 5.4 minutes to reach 80% release and another 8.6 minutes to reach complete release (curve in FIG. 6C). The fast release was attributed to the combination of the nano-sized API crystals and fast-eroding MC matrix. FIG. 6D shows the 80% release time ($t_{80}$) with respect to the drug loading. The $t_{80}$ could be easily tuned by varying the particle size with the same formulation (vertical change in FIG. 6D) and was maintained nearly constant with increasing drug loading (horizontal change in FIG. 6D). The constant $t_{80}$ over a wide range of drug loading reveals that drug products can be designed with a good control over the release performance.

Figure 6E:
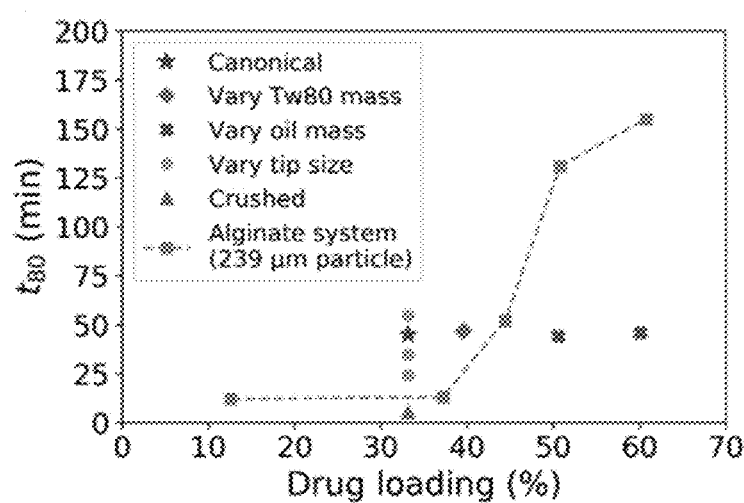
Figure 6F:
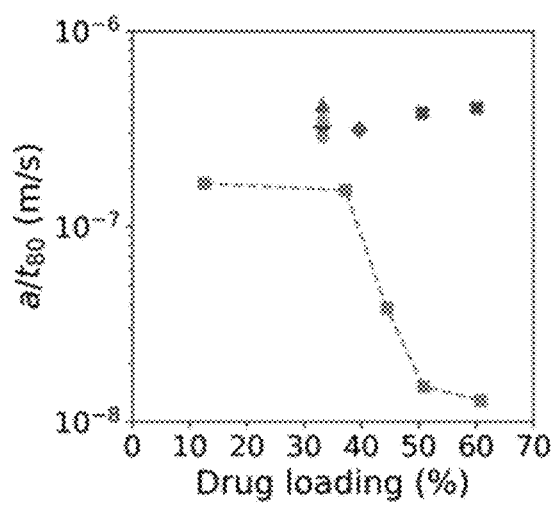
Figure 6G:
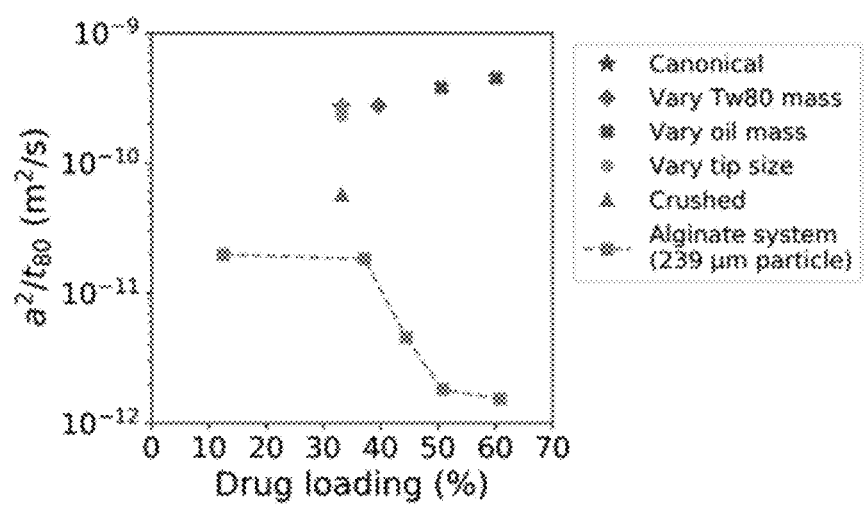
Figure 6H:
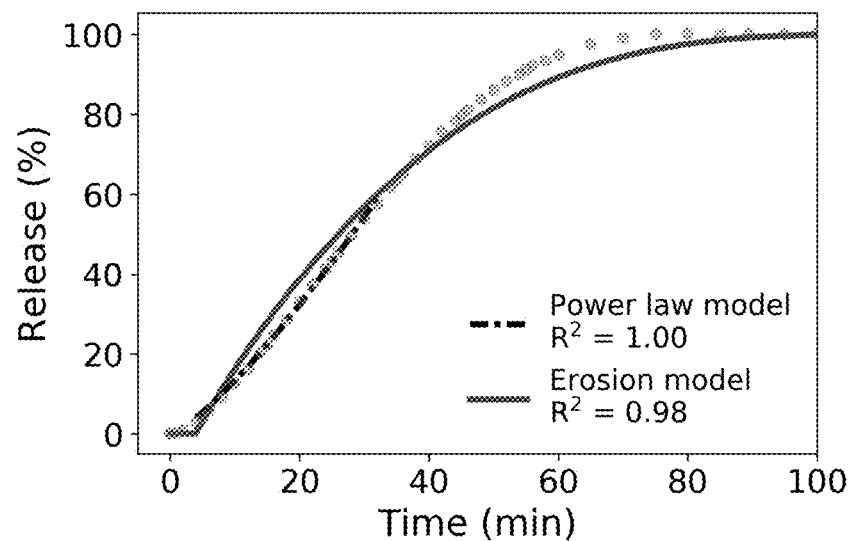
Figure 6I:
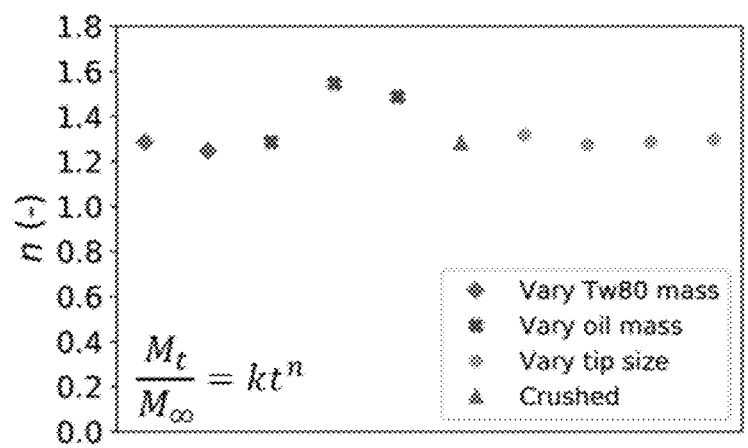

Although it is known that alginate hydrogels formulations have fast release that performs very well against the commercial fenofibrate product, the release rate plummets as the drug loading exceeds 40% (FIG. 6E) (Domenech and Doyle, *Chem. Mater.* 2020, 32, 498). The release mechanism of alginate hydrogels is through dissolution and diffusion (Badruddoza, et al., *Adv. Ther.* 2018, 1, 1700020), and above a certain drug loading threshold the dissolved drug molecules cannot diffuse out effectively for further dissolution. In contrast, the MC particles not only showed a faster release than alginate particles at lower loadings, the MC particles also maintained the good performance at high loadings using both the erosion rate ($a/t_{80}$) and diffusivity ($a^2/t_{80}$) metrics (FIGS. 6F and 6G). To understand the release mechanism of the particles with the MC matrix, a power law model (FIG. 6H with Equation S22) was used to fit the release profiles (Ritger and Peppas, *J. Control. Release* 1987, 5, 37). The power law model can be used to describe the fraction of drug release from 3% to 60%:

$$\frac{M_t}{M_\infty} = kt^n \quad (S22)$$

where $M_t$ and $M_\infty$ are the amount of drug released at time t and infinite time, k is the kinetic constant (with the unit of $t^{-n}$), and n is the diffusional exponent. The value of n is indicative of the drug release mechanism. The exponent n values are greater than 1.2 for all cases (FIG. 6I), showing that the drug release was strongly erosion-controlled (Ford, et al., *Int. J. Pharm.* 1991, 71, 95). This finding agrees well with the observation that the drug release occurs with the eroding matrix and is complete once the particles are fully eroded. The synchronous behavior of the drug release and particle erosion shows that the nanocrystals dissolve very fast and the drug dissolution is no longer a rate-determining step.

To further analyze the release kinetics, an erosion model for an erodible sphere (FIG. 6H with Equation S28) was used to determine the erosion constant and lag time (Hopfenberg, *ACS Symposium Series,* 1976, vol. 33, Chapter 3, pp 26-32). Assuming that there exists a constant erosion constant ($k_e$, with the unit of m/s) and that volume dissolution rate is proportional to the sphere surface, we get the following differential equation.

$$\frac{dV_t}{dt} = k_e \times 4\pi r^2 \quad (S23)$$

The volume dissolved ($V_t$) at time t and the volume for complete dissolution ($V_\infty$) are $$V_t = \frac{4}{3}\pi(a^3 - r^3) \quad (S24)$$

$$V_\infty = \frac{4}{3}\pi a^3 \quad (S25)$$

By solving Equation S23 and Equation S24 simultaneously, we get $$\frac{V_t}{V_\infty} = 1 - \left[1 - \frac{k_e t}{\alpha}\right]^3 \quad (S26)$$

Because the well-dispersed nanoemulsion indicates a uniform drug content in the polymer matrix, the fractional mass release should be equivalent to the fractional volume dissolved:

$$\frac{M_t}{M_\infty} = \frac{V_t}{V_\infty} \quad (S27)$$

To account for the time required to wet the surface of the dried particles, a lag time ($t_{lag}$) was introduced and the resulting erosion model becomes:

$$\frac{M_t}{M_\infty} = 1 - \left[1 - \frac{k_e(t - t_{lag})}{\alpha}\right]^3 \quad (S28)$$

Figure 6J:
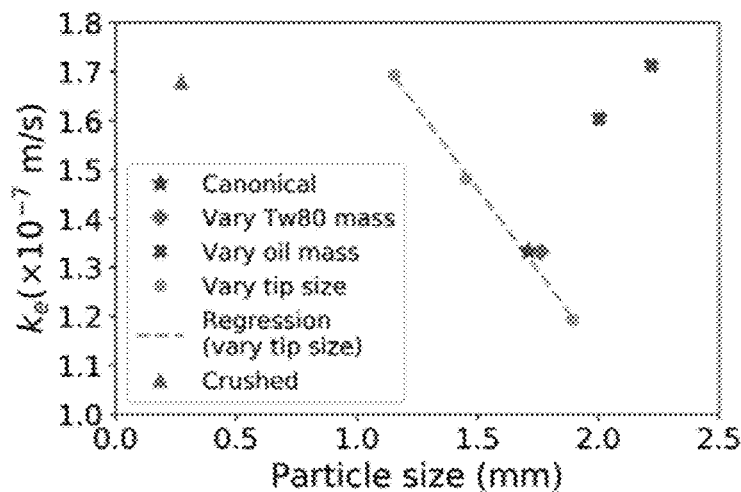

For the same nanoemulsion formulation, the $k_e$ gradually decreases as the particle size increases (FIG. 6J). The trend could explained as that the smaller particles provide a larger surface area for water hydration. The water hydration quickly forms a gel layer on the particle surface, which slows down further water penetration into the dry inner cores. When the drug release starts at $t=t_{lag}$, smaller particles are wetted and swollen to a greater extent. In contrast, larger particles still have a larger portion of dry inner cores which require further wetting before erosion. On average, larger particles have a larger volume of dry inner cores that is protected by the gel layer, thereby leading to a smaller $k_e$.

Figure 2I:
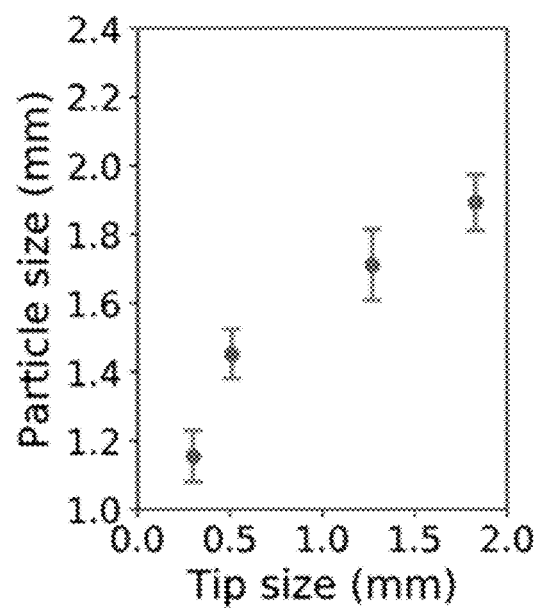
Figure 2J:
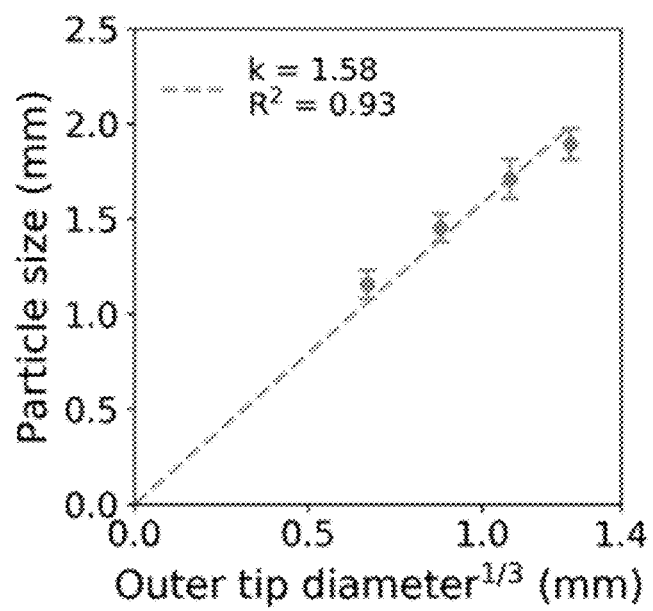
FIG. 2J is a line graph showing Tate's law correlation between particle diameter ($d_{particle}$) and the cube root of the tip outer diameter ($d_T^{1/3}$) for the canonical formulation.
Figure 6K:
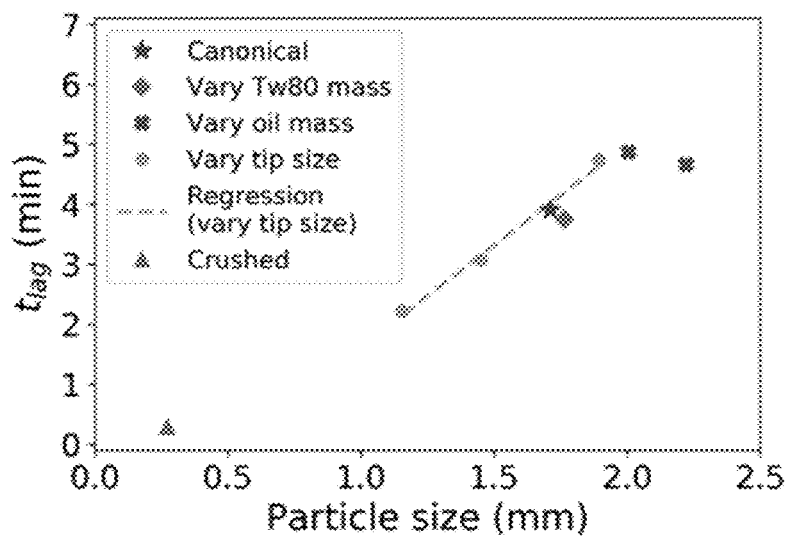

As noted above, the lag time was introduced to account for the release suppression due to the initial wetting of the dried particles when they first contact water (Zhang, et al., *Eur. J. Pharm. Sci.* 2018, 117, 245). The lag time was positively correlated with the particle size (FIG. 6K). The smaller particles have a larger surface area for faster hydration before the erosion plays an important role. For the crushed particles, the wetting and erosion almost happen simultaneously with the lag time approaching zero. Moreover, the erosion model accounting for the particle size can help explain the convoluted effects on the release profiles. Increasing the oil phase mass corresponds to a larger ratio of the dispersed to continuous phases, and the resulting dried particles have a higher drug loading and a lower MC polymer content. Therefore, although the particles were larger for more oil phase addition (FIG. 2I), the lower polymer content led to a faster erosion rate. The two factors offset each other and maintained a nearly constant performance when the oil phase was increased (FIG. 6A).

(vii) Preparation of Nanoparticle Suspensions and Drug-Loaded Tablets

Figure 7:
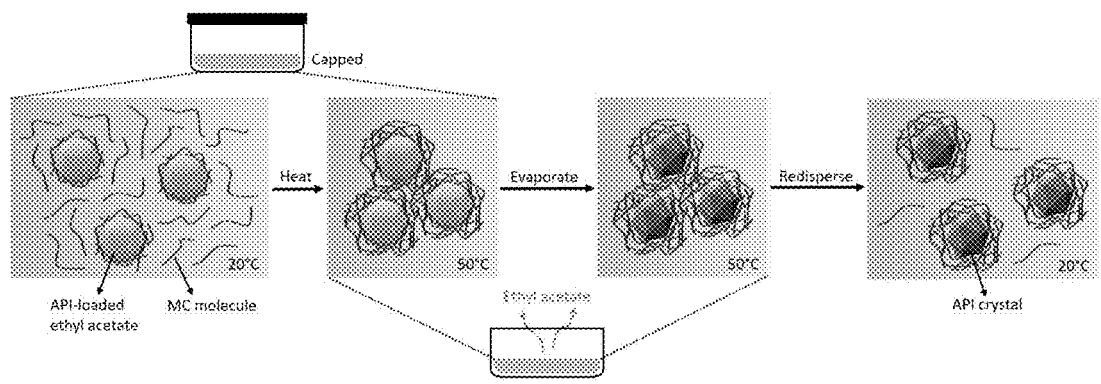
FIG. 7 is a non-limiting schematic showing procedures for preparing API-loaded nanoparticle suspensions.

In addition to the aforementioned particle formulation, the thermogelling nanoemulsion with "smart" responsiveness to temperature can be easily crafted into versatile dosage forms by simple thermal treatment. For the preparation of nanoparticle suspensions, conventional processes are typically time-consuming and can take more than 10 hours to mill down API crystals to a desirable nanoscale range (Shah, et al., *J. Pharm. Sci.* 2016, 105, 10). In contrast, soft oil droplets can be easily broken up into nanodroplets in five minutes and approach the minimum droplet size in 20 minutes (Gupta, et al., *Soft Matter* 2016, 12, 1452). Ethyl acetate was chosen as a fast-evaporating solvent (boiling point of 77.1° C.) to load fenofibrate in order to induce API nanocrystals before the water phase dried out. With the same water phase (3 g 5 wt % MC) and 0.1 g TWEEN® 80, the oil phase of a 0.1 g fenofibrate-in-0.3 g ethyl acetate solution was used to form a thermogelling nanoemulsion. Gelled at 50° C., the nanoemulsion was then evaporated at the same temperature until twice the mass of the added ethyl acetate (~0.6 g) was removed to ensure the complete removal of ethyl acetate. The still hydrated thermogel was redispersed into deionized water to form a polymer-stabilized nanoparticle suspension, and the uniform nanoparticles were not only observed by dynamic light scattering, but also observed by TEM. The redispersed nanoparticles (~216.7 nm and a PDI of 0.218, measured by DLS) were larger than the nanoemulsion droplets (~129.5 nm and a PDI of 0.195), indicating that more MC molecules adsorbed on the nanocrystals for better stability after redispersion (FIG. 7). TEM image analysis of the redispersed nanoparticle suspension showed an average diameter 201.4±34.2 nm. To demonstrate the utility of the thermogel in producing nanocrystals, a control evaporation test conducted at room temperature (below the gel point, such as ~20° C.) showed undesirable nanoemulsion destabilization and large crystal precipitation. Moreover, a thermal molding method was developed to prepare drug tablets. Instead of relying on the multistep mixing/transport of API crystals and excipient powders as in the conventional manufacturing (Kiortsis, et al., *Eur. J. Pharm. Biopharm.* 2005, 59, 73; Ishikawa, et al., *Int. J. Pharm.* 2000, 202, 173), drug tablets with embedded API nanocrystals can be directly formulated in a facile and powderless manner. Without the issue about stimulus penetrability (Suh, et al., *Langmuir* 2011, 27, 13813), heat flux from the environment can easily penetrate through the nanoemulsion in the mold and ensure the complete gelation. The gelled nanoemulsion was then evaporated in situ for one day and the drug tablets were formed.

(viii) Preparation of Oral Thin Films

Lastly, the nanoemulsion can be thermally cast into oral thin films, which are dosage forms that have gained considerable attention in recent years because of their exceptional acceptability for geriatric and pediatric patients (Karki, et al., *Asian J. Pharm. Sci.* 2016, 11, 559). The use of the thermogelling nanoemulsion can avoid dealing with drug crystal agglomeration that is a common problem in the conventional casting process (Sievens-Figueroa, et al., *Int. J. Pharm.* 2012, 423, 496). By gelling and evaporating a liquid film of the nanoemulsion on a poly(dimethylsiloxane) (PDMS) substrate, a paper-like oral thin film with a thickness of ~20 μm can be easily prepared.

In summary, an innovative thermogelling nanoemulsion system has been developed, which can be easily formulated into composite solid dosage drug products with well-controlled API nanocrystals embedded in the MC matrix. The nanoemulsion suspension has a low gel temperature and fast response to temperature changes which enable the realization of effective particle formulation with a thermal dripping method. The thermally gelled nanoemulsion can be directly dried with the precise formation of API nanocrystals templated by the nanodroplets. The API nanocrystals were characterized to be the most stable polymorph and their presence was validated by SEM, XRD, Raman spectroscopy, and DSC analyses. The significantly improved solubility of the nanocrystals was demonstrated in release tests. The fast drug release was not limited by the dissolution of the API nanocrystals and directly controlled by the fast erosion of the MC matrix. Moreover, the release could be easily tuned by varying the particle size, and fast release was maintained for a wide range of drug loadings. To demonstrate the versatility of the nanoemulsion formulation, various dosage forms (nanoparticle suspension, drug tablet, and oral thin film) were prepared with a simple and efficient thermal treatment. Overall, the thermogelling nanoemulsion is applicable for more efficient formulation of drug products, including oral drug products, with high quality and tunable fast release.

Those skilled in the art will recognize, or be able to ascertain using no more than routine experimentation, many equivalents to the specific embodiments of the invention described herein. Such equivalents are intended to be encompassed by the following claims.

We claim:

1. A composition comprising nanoparticles, wherein the nanoparticles comprise nanocrystals encapsulated in thermogelling polymers, and wherein the nanocrystals comprise hydrophobic therapeutic, diagnostic, prophylactic agents, or a combination thereof, wherein forming the nanoparticles involves heating a nanoemulsion comprising:
   (i) a dispersed oil phase that comprises the hydrophobic therapeutic, diagnostic, prophylactic agents, or the combination thereof, and
   (ii) a continuous water phase that comprises the thermogelling polymers.

2. The composition of claim 1, wherein the heating forms a gel matrix comprising oil nanodroplets locked inside the gel matrix.

3. The composition of claim 2, wherein forming the nanoparticles comprises evaporating solvent from the oil nanodroplets.

4. A method of making the composition of claim 1, the method comprising:
step (i): dripping a first composition comprising a first solvent and the hydrophobic therapeutic, diagnostic, prophylactic agents, or the combination thereof, into a second composition comprising a second solvent to form a mixture.

5. The method of claim 4, wherein the first composition is a nanoemulsion.

6. The method of claim 4, comprising:
step (ii): ultra-sonicating or homogenizing the first composition, prior to step (i).

7. The method of claim 6, comprising:
step (ii): removing the second solvent from the mixture after step (i).

8. The method of claim 7, comprising evaporating the first solvent from the mixture concurrently with or after step (ii), preferably in an air-circulating oven, to form the nanocrystals.

9. The method of claim 4, wherein the hydrophobic therapeutic, diagnostic, prophylactic agents, or the combination thereof are in oil nanodroplets comprising the first solvent.

10. The method of claim 4, wherein the first solvent is an organic solvent.

11. The method of claim 4, wherein the first composition is at room temperature.

12. The method of claim 4, wherein the first composition comprises the thermogelling polymers, and
wherein a subset of the thermogelling polymers are adsorbed on oil nanodroplets comprising the first solvent.

13. The method of claim 4, wherein the first solvent is a suitable pharmaceutical organic solvent, a Food and Drug Administration's Generally Regarded as Safe (GRAS) organic solvent, or a combination thereof.

14. The method of claim 4, wherein the first solvent comprises anisole or ethyl acetate.

15. The method of claim 4, wherein the first solvent is saturated with the hydrophobic therapeutic, diagnostic, prophylactic agents, or the combination thereof.

16. The method of claim 4, wherein the first composition, second composition, or both comprise non-ionic surfactants.

17. The method of claim 4, wherein the first composition comprises non-ionic surfactants.

18. The method of claim 4, wherein the second composition comprises non-ionic surfactants.

19. The method of claim 4, wherein the first composition and the second composition comprise non-ionic surfactants.

20. The method of claim 16, wherein non-ionic surfactants comprise polyethylene glycol sorbitan monooleate, polyoxyethylene sorbitan monostearate, polyoxyethylene sorbitan monolaurate, polyoxyethylene sorbitan monopalmitate, polyoxyethylene sorbitan monooleate, polyoxyethylene sorbitan tristearate, polyoxyethylene monooleate, polyoxyethylene monostearate, polyoxyethylene monolaurate, polyoxyethylene sorbitan trioleate, glyceryl monostearate, sorbitan monooleate, sorbitan monolaurate, sorbitan monoisostearate, sorbitan monopalmitate, sorbitan monostearate, sorbitan sesquioleate, sorbitan trioleate, diglycerolsorbitan penta-2-ethylhexylate, diglycerolsorbitan tetra-2-ethylhexylate, or a combination thereof.

21. The method of claim 16, wherein the non-ionic surfactants have a hydrophilic-lipophilic balance value greater than 8.

22. The method of claim 16, wherein the non-ionic surfactants comprise polyethylene glycol sorbitan monooleate.

23. The method of claim 4, wherein the first composition comprises an inorganic salt.

24. The method of claim 23, wherein the inorganic salt comprises alkali metal ions, halide ions, or both.

25. The method of claim 23, wherein the inorganic salt comprises sodium chloride.

26. The method of claim 4, wherein the second composition comprises water.

27. The method of claim 4, wherein the second composition is at a temperature effective to gel the first composition.

28. The method of claim 27, wherein the temperature effective to gel the first composition is less than a temperature at which crystallization of the hydrophobic therapeutic, diagnostic, prophylactic agents, or the combination thereof occurs.

29. The method of claim 27, wherein temperature effective to gel the first composition is greater than about 20° C.

30. The method of claim 4, wherein dripping the first composition into the second composition occurs at a drip height of between about 1 cm and about 5 cm,
wherein the drip height is measured from the tip of a dripping device to the surface of the second composition in a suitable container.

31. The method of claim 4, wherein dripping the first composition into the second composition occurs at a drip height of about 1 cm.

32. The composition of claim 1, wherein the hydrophobic therapeutic, diagnostic, prophylactic agents, or the combination thereof comprise at least 45% wt/wt of the nanoparticles, as measured using UV-Vis spectroscopy.

33. The composition of claim 1, wherein at least 80% of the nanoparticles have an average diameter within 10% of 200 nm, 300 nm, or 500 nm, as measured via dynamic light scattering or scanning electron microscopy.

34. The composition of claim 1, wherein the nanoparticles, nanocrystals, or both, have a polydispersity index less than 0.25, as measured via dynamic light scattering or scanning electron microscopy.

35. The composition of claim 1, wherein the nanocrystals have an average diameter between 1 nm and 999 nm, inclusive, as measured via scanning electron microscopy.

36. The composition of claim 1, wherein the nanocrystals comprise hydrophobic therapeutic agents.

37. The composition of claim 1, wherein the nanoparticles are crosslinked via crosslinking polymers.

38. The composition of claim 37, wherein the crosslinking polymers are thermogelling polymers that are of the same type as the thermogelling polymers encapsulating the nanocrystals.

39. The composition of claim 1, wherein the thermogelling polymers are water-soluble at 20° C.

40. The composition of claim 1, wherein the thermogelling polymers comprise cellulose ethers, chitosans, gelatins, xyloglucans, dextrans, poly(γ-glutamates), elastins, elastin-like polypeptides/oligopeptides, hyaluronic acids, N-isopropylacrylamide polymers, poly(N-isopropylacrylamide)-b-poly(ethylene glycol)-b-poly(N-isopropylacrylamide), poloxamers, nonionic poly(ethylene glycol)-b-poly(propylene oxide)-b-poly(ethylene glycol)), poly(ethylene glycol)-biodegradable polyester copolymers, poly(oxazolines), poly(organophosphazenes), blends, and copolymers thereof.

41. The composition of claim 1, wherein the thermogelling polymers comprise cellulose ethers.

42. The composition of claim 41, wherein the cellulose ethers comprise methylcellulose, hydroxypropyl methylcellulose, ethylcellulose, or a combination thereof.

43. The composition of claim 41, wherein the cellulose ethers comprise methylcellulose.

44. The composition of claim 1, wherein the thermogelling polymers interact with each other via hydrophobic interactions, hydrogen bonding interactions, electrostatic interactions, or a combination thereof.

45. The composition of claim 1, wherein the thermogelling polymers interact with each other via hydrophobic interactions.

46. The composition of claim 1, further comprising non-ionic surfactants.

47. The composition of claim 46, wherein the non-ionic surfactants comprise polyethylene glycol sorbitan monooleate, polyoxyethylene sorbitan monostearate, polyoxyethylene sorbitan monolaurate, polyoxyethylene sorbitan monopalmitate, polyoxyethylene sorbitan monooleate, polyoxyethylene sorbitan tristearate, polyoxyethylene monooleate, polyoxyethylene monostearate, polyoxyethylene monolaurate, polyoxyethylene sorbitan trioleate, glyceryl monostearate, sorbitan monooleate, sorbitan monolaurate, sorbitan monoisostearate, sorbitan monopalmitate, sorbitan monostearate, sorbitan sesquioleate, sorbitan trioleate, diglycerolsorbitan penta-2-ethylhexylate, diglycerolsorbitan tetra-2-ethylhexylate, or a combination thereof.

48. The composition of claim 46, wherein the non-ionic surfactants have a hydrophilic-lipophilic balance value greater than 8.

49. The composition of claim 46, wherein the non-ionic surfactants comprise polyethylene glycol sorbitan monooleate.

50. The composition of claim 1, in the form of macroparticles.

51. The composition of claim 50, wherein the macroparticles comprise spheres, spheroids, or a combination thereof.

52. The composition of claim 51, wherein the spheres, spheroids, or the combination thereof have an average diameter between 1 mm and 10 mm, inclusive, as measured via dynamic light scattering, scanning electron microscopy, or confocal microscopy.

53. The composition of claim 1 in a liquid, solid, or semi-solid dosage form.

54. The composition of claim 1 in a suspension dosage form, solution dosage form, paste dosage form, powder dosage form, tablet dosage form, film dosage form, capsule dosage form, granule dosage form, fibrous dosage forms, or paper dosage forms.

55. The composition of claim 1, comprising an enteric coating.

56. The composition of claim 55, wherein the enteric coating comprises methyl acrylate-methacrylic acid copolymers, cellulose acetate phthalate, cellulose acetate succinate, hydroxypropyl methylcellulose phthalate, hydroxypropyl methylcellulose acetate succinate, polyvinyl acetate phthalate, methyl methacrylate-methacrylic acid copolymers, cellulose acetate trimellitate, sodium alginate, zein, or a combination thereof.

57. The composition of claim 55, wherein the enteric coating covers all or a portion of the surface of the nanoparticles, solid dosage form, semi-solid dosage form, or a combination thereof.

* * * * *